United States Patent
Rubin

(10) Patent No.: US 12,056,577 B1
(45) Date of Patent: *Aug. 6, 2024

(54) ACCELERATING HYBRID QUANTUM/CLASSICAL ALGORITHMS

(71) Applicant: Rigetti & Co, LLC, Berkeley, CA (US)

(72) Inventor: Nicholas C. Rubin, Berkeley, CA (US)

(73) Assignee: Rigetti & Co, LLC, Berkeley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/180,513

(22) Filed: Mar. 8, 2023

Related U.S. Application Data

(63) Continuation of application No. 15/917,731, filed on Mar. 11, 2018, now Pat. No. 11,604,644.

(60) Provisional application No. 62/553,667, filed on Sep. 1, 2017, provisional application No. 62/500,361, filed on May 2, 2017.

(51) Int. Cl.
| | |
|---|---|
| *G06N 10/80* | (2022.01) |
| *G06F 9/30* | (2018.01) |
| *G06F 17/16* | (2006.01) |
| *G06N 10/00* | (2022.01) |
| *G06N 10/70* | (2022.01) |

(52) U.S. Cl.
CPC ........... *G06N 10/80* (2022.01); *G06F 9/3001* (2013.01); *G06F 17/16* (2013.01); *G06N 10/00* (2019.01); *G06N 10/70* (2022.01)

(58) Field of Classification Search
CPC ........ G06N 10/80; G06N 10/00; G06N 10/70; G06F 9/3001; G06F 17/16
See application file for complete search history.

(56) References Cited

U.S. PATENT DOCUMENTS

| | | | | |
|---|---|---|---|---|
| 2005/0273306 | A1* | 12/2005 | Hilton | B82Y 10/00 |
| | | | | 703/11 |
| 2016/0321559 | A1* | 11/2016 | Rose | G06N 10/00 |

FOREIGN PATENT DOCUMENTS

| | | |
|---|---|---|
| WO | 2003056512 | 7/2003 |

OTHER PUBLICATIONS

Shenvi et al, "Expectation value constraints for the N-representability problem," Aug. 18, 2006 (Year: 2006).*
Guerreschi et al, "Practical optimization for hybrid quantum-classical algorithms," Jan. 9, 2017 (Year: 2017).*
McClean et al, "The theory of variational hybrid quantum-classical algorithms," 2016 (Year: 2016).*

(Continued)

*Primary Examiner* — Farley Abad
(74) *Attorney, Agent, or Firm* — Henry Patent Law Firm PLLC

(57) ABSTRACT

In a general aspect, hybrid quantum/classical algorithms are executed in a computing system. A first set of values representing a measurement of a reduced density matrix (RDM) is obtained. The first set of values is based on sampling quantum states generated by a quantum processor. A classical processor generates a second, different set of values to represent the measurement of the RDM. The second set of values is constructed based on the first set of values by a process that imposes one or more n-representability conditions on the second set of values to represent the measurement of the RDM.

22 Claims, 14 Drawing Sheets

(56) References Cited

OTHER PUBLICATIONS

Baumgratz, et al., "Lower bounds for ground states of condensed matter systems", New Journal of Physics 14, Feb. 13, 2012, 21 pgs.
Bravyi, "Requirements for Copatibility Between Local and Multipartite Quantum States", Quantum Information and Computation, vol. 4, No. 1, 2004, 15 pgs.
Burer, et al., "A nonlinear programming algorithm for solving semidefinite programs via low-rank factorization", Math. Program., Ser. B 95, Dec. 9, 2002, 29 pgs.
Burer, "Local Minima and Convergence in Low-Rank Semidefinite Programming", Math. Program., Ser. A 103, Dec. 29, 2004, 18 pgs.
Coleman, "Reduced Density Operators and the N-Particle Problem", Intl Journal of Quantum Chemistry, vol. XIII, 1978, 16 pgs.
Coleman, et al., "Reduced Hamiltonian Orbitals. III. Unitarily Invariant Decomposition of Hermitian Operators", Intl Journal of Quantum Chemistry, vol. XVIII, 1980, 29 pgs.
Coleman, "Structure of Fermion Density Matrices", Review of Modern Physics, vol. 35, No. 3, Jul. 1963, 20 pgs.
Coleman, "The Convex Structure of Electrons", Intl Journal of Quantum Chemistry, vol. XI, 1977, 10 pgs.
Cramer, et al., "Efficient quantum state tomography", arXiv:1101. 4366v1, Jan. 23, 2011, 9 pgs.
Devroye, "Sample-Based Non-Uniform Random Variate Generation", Proceedings of the 1986 Winter Simulation Conference, 1986, 6 pgs.
Erdahl, "Representability", Intl Journal of Quantum Chemistry, vol. XIII, 1978, 22 pgs.
Foley, et al., "Measurement-driven reconstruction of many-particle quantum processes by semidefinite programming with application to photosynthetic light harvesting", Phys.Rev.A 86, 012512, Jul. 23, 2012, 9 pgs.
Fosso-Tande, et al., "Accuracy of two-particle N-representability conditions for describing different spin states and the singlet-triplet gap in the linear acene series", Molecular Physics, 2015, 8 pgs.
Garrod, et al., "Reduction of the N-Particle Variational Problem", J. Mathematical Physics, vol. 5, No. 12, Dec. 1964, 21 pgs.
Gidofalvi, et al., "Spin and symmetry adaptation of the variational two-electron reduced-density-matrix method", Phys.Rev. A 72, Nov. 14, 2005, 8 pgs.
Guerreschi, et al., ""Practical Optimization for Hybrid Quantum-Classical Algorithms"", arXiv:1701.01450v1 [quant-ph], Jan. 5, 2017, 25 pgs.
Hammond, et al., "Variational two-electron reduced-density-matrix theory: Partial 3-positivity conditions for N-representability", Phys. Rev.A, 71, Jun. 21, 2005, 7 pgs.
Higham, "Computing a Nearest Symmetric Positive Semidefinite Matrix", Linear algebra and its applications 103, 1988, 16 pgs.
Higham, "Computing the nearest correlation matrix—a problem from finance", IMA Journal of Numerical Analysis 22, 2002, 15 pgs.
Klyachko, "Quantum marginal problem and N-representability", Journal of Physics: Conference Series 36, 2006, 15 pgs.
Kummer, "n-Representability Problem for Reduced Density Matrices", Journal of Mathematical Physics, Oct. 1967, 19 pgs.
Lanssens, et al., "Method for Making 2-Electron Response Reduced Density Matrices Approximately N-Representable", arXiv:1707. 01022, Jul. 4, 2017, 12 pgs.
Liu, "Consistency of Local Density Matrices is QMA-Complete", Approximation, Randomization, and Combinatorial Optimization. Algorithms and Techniques (Springer 2006), 2006, 12 pgs.
Lowdin, "Some Aspects on the Development of the Theory of Reduced Density Matrices and the Representability Problem", Density Matrices and Density Functionals: Proceedings of the A. John Coleman Symposium (Springer), 1987, 29 pgs.
Mazziotti, "Large-Scale Semidefinite Programming for Many-Electron Quantum Mechanics", Phys.Rev.Lett. 106, 083001, Feb. 2011, 4 pgs.
Mazziotti, "Pure-N-representability conditions of two-fermion reduced density matrices", Phys.Rev. A 94, 032516, Sep. 29, 2016, 5 pgs.
Mazziotti, "Structure of Fermionic Density Matrices: Complete N-Representability Conditions", Phys.Rev.Lett. 108, 263002, Jun. 2012, 5 pgs.
Mazziotti, et al., "Uncertainty relations and reduced density matrices: Mapping many-body quantum mechanics onto four particles", Phys.Rev.A, 63, 042113, Mar. 21, 2001, 9 pgs.
Mazziotti, "Variational minimization of atomic and molecular ground-state energies via the two-particle reduced density matrix", Phys.Rev. A, 65, Jun. 18, 2002, 14 pgs.
Mazziotti, "Variational reduced-density-matrix method using three-particle N-representability conditions with application to many-electron molecules", Phys.Rev. A 74, 032501, Sep. 1, 2006, 9 pgs.
McClean, et al., "Exploiting Locality in Quantum Computation for Quantum Chemistry", The Journal of Physical Chemistry Letters, Nov. 25, 2014, 13 pgs.
McClean, et al., "Hybrid quantum-classical hierarchy for mitigation of decoherence and determination of excited states", Phys.Rev. A 95, 042308, Apr. 6, 2017, 10 pgs.
McClean, et al., "OpenFermion: The Electronic Structure Package for Quantum Computers", arXiv:1710.07629v3, Mar. 6, 2018, 19 pgs.
McClean, et al., "The theory of variational hybrid quantum-classical algorithms", New J. Phys. 18 (2016)023023, Feb. 5, 2016, 23 pgs.
Nakata, et al., "Variational calculations of fermion second-order reduced density matrices by semidefinite programming algorithm", J.Chem.Phys. 114, 19, May 15, 2001, 11 pgs.
Parrish, et al., "PSI4 1.1: An Open-Source Electronic Structure Program Emphasizing Automation, Advanced Libraries, and Interoperability", J. Chem.Theory Comput., May 10, 2017, 13 pgs.
Percus, "The Role of Model Systems in the Few-Body Reductio of the N-Fermion Problem", Intl Journal of Quantum Chemistry, vol. XIII, 1978, 36 pgs.
Povh, et al., "A Boundary Point Method to Solve Semidefinite Programs", Computing 78, Nov. 9, 2006, 10 pgs.
Raeisi, et al., "Quantum-circuit design for efficient simulations of many-body quantum dynamics", New Journal of Physics 14, Oct. 9, 2012, 26 pgs.
Romero, et al., "Strategies for quantum computing molecular energies using the unitary coupled cluster ansatz", arXiv:1701. 02691, Jan. 10, 2017, 18 pgs.
Rubin, et al., "Application of fermionic marginal constraints to hybrid quantum algorithms", arXiv:1801.03524v1, Jan. 10, 2018, 23 pgs.
Rubin, et al., "Application of fermionic marginal constraints to hybrid quantum algorithms", arXiv:1801.03524v2, May 15, 2018, 24 pgs.
Rubin, et al., "Comparison of one-dimensional and quasi-one-dimensional Hubbard models from the variational two-electron reduced-density-matrix method", Theor Chem Acc 133:1492, May 21, 2014, 9 pgs.
Rubin, et al., "Strong Electron Correlation in Materials from Pair-Interacting Model Hamiltonians", J.Phys.Chem., Mar. 26, 2015, 8 pgs.
Sakurai, et al., "Modern Quantum Mechanics Revised Edition", Addison-Wesley Publishing Company, 1994, 509 pgs.
Shankar, "Principles of Quantum Mechanics, second edition", Springer Science & Business Media, 2012, 675 pgs.
Smolin, et al., "Efficient Method for Computing the Maximum-Likelihood Quantum State from Measurements with Additive Gaussian Noise", Phys.Rev.Lett. 108, 070502, Feb. 2012, 4 pgs.
Zhao, et al., "The reduced density matrix method for electronic structure calculations and the role of three-index representability conditions", J. Chemical Physics 120,5, Feb. 1, 2004, 10 pgs.

\* cited by examiner

ACCELERATING HYBRID QUANTUM/CLASSICAL ALGORITHMS

CROSS-REFERENCE TO RELATED APPLICATIONS

This application is a continuation of U.S. patent application Ser. No. 15/917,731 filed Mar. 11, 2018, which claims priority to U.S. Provisional Application No. 62/500,361 entitled "Accelerating Hybrid Quantum/Classical Algorithm" and filed May 2, 2017, which is hereby incorporated by reference. The U.S. patent application Ser. No. 15/917,731 also claims priority to U.S. Provisional Application No. 62/553,667, filed Sep. 1, 2017, entitled "Accelerated Operator Averaging With Iterative Representability Convergence."

BACKGROUND

The present disclosure relates to accelerating hybrid quantum/classical algorithms.

Quantum processors can perform computational tasks by executing quantum algorithms. Quantum algorithms are often expressed in terms of quantum logic operations applied to qubits. A variety of physical systems have been developed for quantum computing applications. Examples include superconducting circuits, trapped ions, spin systems and others. In some systems, one or more quantum processors operate with classical computing resources to execute hybrid classical/quantum algorithms.

BRIEF DESCRIPTION OF THE DRAWINGS

FIGS. 8-14 are also shown in the publication entitled "Application of fermionic marginal constraints to hybrid quantum algorithms," by Nicholas C. Rubin, et al., arXiv: 1801.03524 [quant-ph] (URL: https://arxiv.org/abs/1801.03524.pdf), dated Jan. 10, 2018, which is hereby incorporated by reference for all purposes.

DETAILED DESCRIPTION

Figure 1:
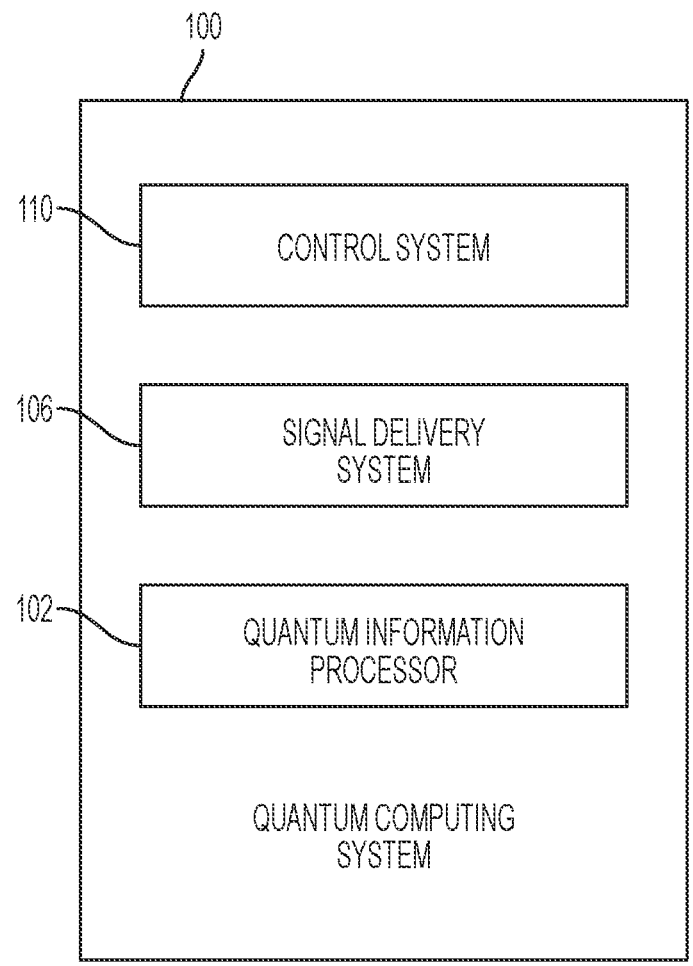
FIG. 1 is a schematic diagram of an example quantum computing system.

In many computational processes that are used to solve electronic structure problems or optimization problems, a quantum computer is used as a co-processor in a heterogeneous computing environment. The hybrid algorithms that use the quantum processor and classical processor can be constructed in the form of a functional minimization, where the quantum computer prepares a large distribution based on a small number of parameters supplied by the classical computer. The classical computer can then change the parameters such that the distribution sampled from the quantum computer is changed to achieve the objective.

In some aspects of what is described here, a quantum system is simulated. Some quantum algorithms, for example, hybrid classical/quantum algorithms, can use restricted tomography of the quantum state to measure reduced density matrices (RDMs), or marginals, of the full state. One approach to this algorithmic step estimates the components of the marginal independently without necessarily making use of the algebraic and geometric structure of the marginals. This approach can be referred to the fermionic n-representability conditions.

In various aspects, these conditions can be used for quantum computation, and can be used to develop techniques to accelerate and improve applications for quantum chemistry on quantum computers. In another aspect, described herein includes using fermionic n-representability conditions to reduce the total number of measurements of a quantum state by more than an order of magnitude, for example, for medium sized systems in chemistry applications. In an aspect, techniques for efficient restoration of the physicality of a measured marginal are described. As a demonstration, physically relevant observables are restored via the projection procedure after corruption by physically relevant error channels. Accordingly, the techniques described herein can be useful for pre-fault tolerant quantum chemistry experiments.

In many computational processes that are used to solve electronic structure problems or optimization problems, a quantum computer can be used as a co-processor in a heterogeneous computing environment. The hybrid algorithms that use the quantum processor and classical processor can be constructed in the form of a functional minimization, where the quantum computer prepares a large distribution based on a small number of parameters supplied by the classical computer. The classical computer can change the parameters such that the distribution sampled from the quantum computer is changed to achieve the computational objective.

In such applications, expected values (e.g., mean of an operator) may need to be constructed. This can be achieved through a process of sampling until some predefined error bound on the mean is reached. The techniques described herein relate to a sampling methodology that can reduce the number of samples required for a rigorous bound on the accuracy of the estimator which effectively removes stochastic errors associated with the overall hybrid quantum algorithm.

In some implementations, a process is described for reconstructing the closest ensemble p-order marginal according to the marginal observed on the device. In particular, the reconstruction can be performed according to approximate n-representability, such that the reconstructed marginal satisfies conditions associated with marginal of valid fermionic wavefunctions.

In some implementations, the processes described herein can improve the sampling procedure, which can include a subroutine of the overall functional optimization using a quantum coprocessor. Additional modifications to the reconstruction routine are also described which can improve upon other subroutines in hybrid classical/quantum methods. First, by combining the reconstruction SDP with the regularity of the p-order marginal, a reduction of the effects of a noisy gradient or a noisy step-direction computed from finite difference or a stochastic gradient can be obtained. Alternatively or additionally, the norm minimization SDP can be combined with an energy minimization SDP. This can thereby avoid some of the potential issues with variational 2-RDM methods by further constraining the marginal reconstruction with experimental observations.

One feature of the n-representability informed projection method is minimizing the error of the p-marginal measured from a quantum resource. By additionally using density matrix purification techniques for the determination of ground or excited states, more information can be extracted, for example, by further classical post-processing of the density matrix. One such purification technique that works with using the quantum coprocessor to determine p-order marginals is purification through an iterative solution, as will be further described below.

In various aspects, described herein are techniques for calculating expected values of operators relevant for a quantum process, for example solving electronic structure problems via a hybrid algorithm or combinatorial optimization. Two examples of this include a frequentists approach for operator averaging by sampling and a Bayesian approach for operator averaging.

In some implementations, the operators to measure can include the elements of the p-order marginal, where p is the locality of the Hamiltonian of the system. For example, chemical Hamiltonians can be 2-local in terms of second quantized fermionic operators. Therefore, the 2-marginal of the distribution prepared on the QPU can be measured.

It can be conjectured that the same reconstruction scheme can be combined with variational 2-RDM minimization and can improve variational 2-RDM energy minimization by restricting the space of n-representable matrices with information from the quantum processor.

FIG. 1 is a schematic diagram of an example quantum computer system 100. The example quantum computer system 100 shown in FIG. 1 includes a control system 110, a signal delivery system 106, and a quantum information processor 102. A quantum computing system may include additional or different features, and the components of a quantum computing system may operate as described with respect to FIG. 1 or in another manner.

The example quantum computer system 100 shown in FIG. 1 can perform quantum computational tasks (such as, for example, quantum simulations or other quantum computational tasks) by executing quantum algorithms. In some implementations, the quantum computer system 100 can perform quantum computation by storing and manipulating information within individual quantum states of a composite quantum system. For example, qubits (i.e., quantum bits) can be stored in and represented by an effective two-level sub-manifold of a quantum coherent physical system in the quantum information processor 102.

In some implementations, the quantum computer system 100 can operate using gate-based models for quantum computing. For example, the qubits can be initialized in an initial state, and a quantum logic circuit comprised of a series of quantum logic gates can be applied to transform the qubits and extract measurements representing the output of the quantum computation. In some implementations, the quantum computing system 100 can operate as a quantum annealer or another type of system that uses an adiabatic model for quantum computing. For instance, the qubits can be initialized in an initial state, and the controlling Hamiltonian can be transformed adiabatically by adjusting control parameters to another state that can be measured to obtain an output of the quantum computation.

The example quantum information processor 102 shown in FIG. 1 may be implemented, for example, as a superconducting quantum integrated circuit that includes qubit devices. The qubit devices may be used to store and process quantum information, for example, by operating as ancilla qubits, data qubits or other types of qubits in a quantum algorithm. Coupler devices in the superconducting quantum integrated circuit may be used to perform quantum logic operations on single qubits or conditional quantum logic operations on multiple qubits. In some instances, the conditional quantum logic can be performed in a manner that allows large-scale entanglement within the quantum information processor 102. Control signals may be delivered to the superconducting quantum integrated circuit, for example, to manipulate the quantum states of individual qubits and the joint states of multiple qubits. In some instances, information can be read from the superconducting quantum integrated circuit by measuring the quantum states of the qubit devices. The quantum information processor 102 may be implemented using another type of physical system.

The example quantum information processor 102, and in some cases all or part of the signal delivery system 106, can be maintained in a controlled cryogenic environment. The environment can be provided, for example, by shielding equipment, cryogenic equipment, and other types of environmental control systems. In some examples, the components in the quantum information processor 102 operate in a cryogenic temperature regime and are subject to very low electromagnetic and thermal noise. For example, magnetic shielding can be used to shield the system components from stray magnetic fields, optical shielding can be used to shield the system components from optical noise, thermal shielding and cryogenic equipment can be used to maintain the system components at controlled temperature, etc.

In the example shown in FIG. 1, the signal delivery system 106 provides communication between the control system 110 and the quantum information processor 102. For example, the signal delivery system 106 can receive control signals from the control system 110 and deliver the control signals to the quantum information processor 102. In some instances, the signal delivery system 106 performs preprocessing, signal conditioning, or other operations to the control signals before delivering them to the quantum information processor 102.

In some implementations, the signal delivery system 106 includes connectors or other hardware elements that transfer signals between the quantum information processor 102 and the control system 110. For example, the connection hardware can include signal lines, signal processing hardware, filters, feedthrough devices (e.g., light-tight feedthroughs, etc.), and other types of components. In some implementations, the connection hardware can span multiple different temperature and noise regimes. For example, the connection hardware can include a series of temperature stages that decrease between a higher temperature regime (e.g., at the control system 110) and a lower temperature regime (e.g., at the quantum information processor 102).

In the example quantum computer system 100 shown in FIG. 1, the control system 110 controls operation of the quantum information processor 102. The example control system 110 may include data processors, signal generators, interface components and other types of systems or subsystems. Components of the example control system 110 may operate in a room temperature regime, an intermediate temperature regime, or both. For example, the control system 110 can be configured to operate at much higher temperatures and be subject to much higher levels of noise than are present in the environment of the quantum information processor 102.

In some implementations, the control system 110 includes a classical computing system that executes software to compile instructions for the quantum information processor 102. For example, the control system 110 may decompose a quantum logic circuit or quantum computing program into discrete control operations or sets of control operations that can be executed by the hardware in the quantum information processor 102. In some examples, the control system 110 applies a quantum logic circuit by generating signals that cause the qubit devices and other devices in the quantum information processor 102 to execute operations. For instance, the operations may correspond to single-qubit gates, two-qubit gates, qubit measurements, etc. The control system 110 can generate control signals that are communicated to the quantum information processor 102 by the signal delivery system 106, and the devices in the quantum information processor 102 can execute the operations in response to the control signals.

In some cases, the control system 110 includes one or more classical computers or classical computing components that produce a control sequence, for instance, based on a quantum computer program to be executed. For example, a classical processor may convert a quantum computer program (e.g., instructions written in the Quil programming language) to an instruction set for the native gate set or architecture of the quantum information processor 102. In some cases, the control system 110 includes a microwave signal source (e.g., an arbitrary waveform generator), a bias signal source (e.g., a direct current source) and other components that generate control signals to be delivered to the quantum information processor 102. The control signals may be generated based on a control sequence provided, for instance, by a classical processor in the control system 110. The example control system 110 may include conversion hardware that digitizes response signals received from the quantum information processor 102. The digitized response signals may be provided, for example, to a classical processor in the control system 110.

In some cases, the quantum computer system 100 includes multiple quantum information processors 102 that operate as respective quantum processor units (QPU). In some cases, each QPU can operate independent of the others. For instance, the quantum computer system 100 may be configured to operate according to a distributed quantum computation model, or the quantum computer system 100 may utilize multiple QPUs in another manner. In some implementations, the quantum computer system 100 includes multiple control systems, and each QPU may be controlled by a dedicated control system. In some implementations, a single control system can control multiple QPUs; for instance, the control system 110 may include multiple domains that each control a respective QPU.

Figure 2:
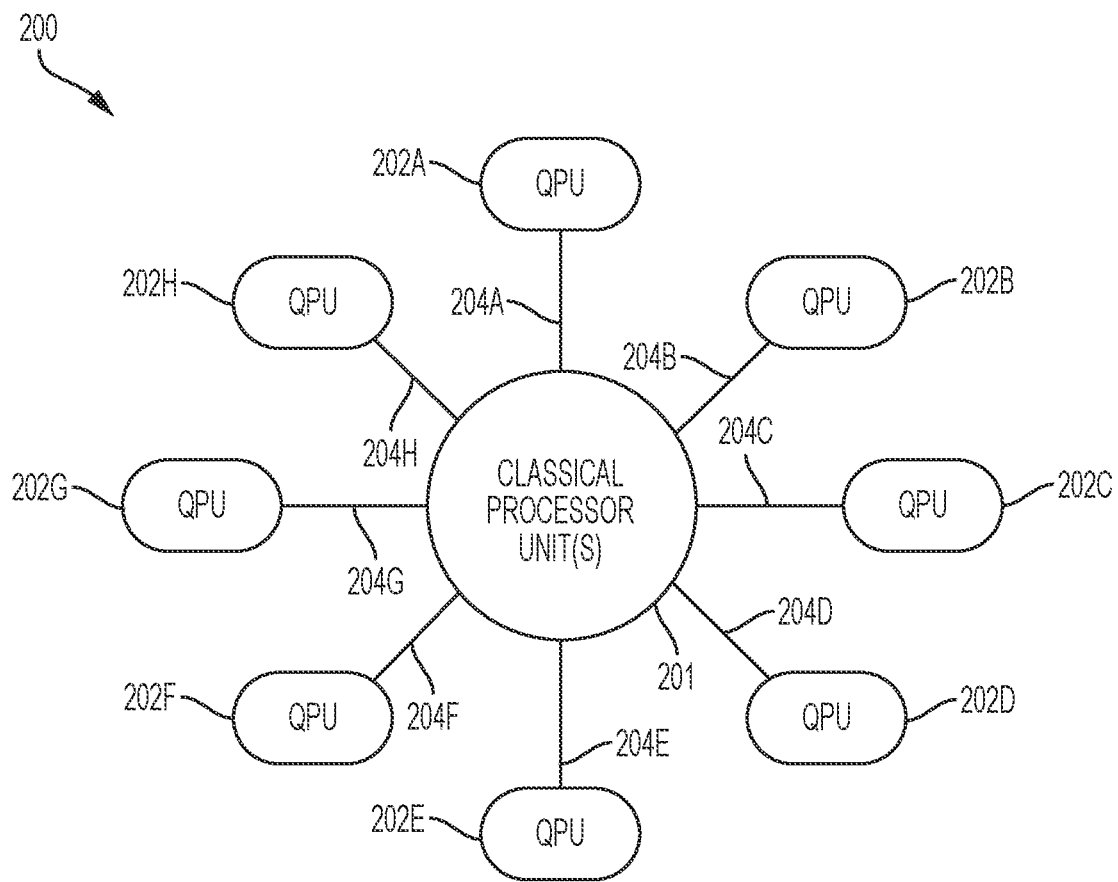
FIG. 2 is a schematic diagram of an example computing system that includes multiple quantum processor units (QPUs).

FIG. 2 is a schematic diagram of an example computer system 200 that includes multiple quantum processor units (QPUs). The example computer system 200 may be implemented as a distributed computing system, for example, with QPUs operating in disparate locations; or the QPUs may operate in proximity to each other, for example, in a common facility or structure.

The example computer system 200 shown in FIG. 2 includes one or more classical processor unit(s) 201 communicably connected with eight quantum processor units 202A, 202B, 202C, 202D, 202E, 202F, 202G, 202H (collectively, the "QPUs 202"). The example computer system 200 may include another number of QPUs (e.g., less than eight, or tens or hundreds of them). The classical processor unit(s) 201 communicate with the QPUs 202 through the respective interfaces 204A, 204B, 204C, 204D, 204E, 204F, 204G, 204H (collectively, the "interfaces 204"). The computer system 200 may include additional or different components, and the components may be arranged as shown in FIG. 2 or in another manner.

The classical processor unit(s) 201 may be implemented using various types of classical computational resource, for example, one or more general purpose microprocessors that can run applications and programs by executing or interpreting software, scripts, functions, executables, and other types of computer program code. In some cases, the classical processor unit(s) 201 can be implemented on a dedicated chip or chipset, or it can be integrated with other devices on a shared chip. In some implementations, the classical processor unit(s) 201 can be or include a single-core processor, a multi-core processor that includes multiple processing units, or one or more commercially-available products.

One or more of the classical processor unit(s) 201 may operate as a host device that can control operation of the QPUs 202. For instance, the host device can operate as a master device that delegates processing tasks to the QPUs and controls timing and dataflow in the computer system 200. For example, the host device may identify QPUs to execute individual sub-processes in an algorithm, and the host device may delegate the sub-process to the QPUs, for instance, by sending associated instructions to the respective QPUs. In some cases, the sub-process delegated to each QPU represents a particular sub-problem of a large quantum system that is being simulated in the computer system 200; the sub-problems can be computed by the QPUs and then reintegrated into the total solution by the classical processor unit(s) 201.

In some instances, the QPUs can operate as specialized processors that are configured to supplement functionality of the classical processor unit(s) 201, for example, in simulations of quantum systems. A co-processor can include hardware, firmware, or other features configured to execute a class of operations or a class of functions faster or otherwise more efficiently than the main processor. In some implementations, the computer system 200 includes the QPUs 202 and multiple other distinct types of computing modules, such as, for example, FPGAs, application-specific integrated circuits (ASICs), systems-on-chip (SoCs) or other processor devices. Operation of the QPUs and other devices can be supervised or otherwise controlled by one or more of the classical processor unit(s) 201.

Each of the example QPUs 202 includes qubit devices that define the computational state of that QPU. In the example shown in FIG. 2, the QPUs 202 operate as unentangled units, which means that none of the QPUs 202 becomes entangled with any of the other QPUs 202 during operation of the computer system 200. For example, the QPU 202A does not become entangled with any of the other QPUs 202B, 202C, 202D, 202E, 202F, 202G, 202H during operation of the computer system 200. Although qubit devices within the same QPU can become entangled with each other, qubit devices not within the same QPU cannot become entangled with each other during operation of the example computer system 200.

In the example shown in FIG. 2, each QPU 202 can include any type of data processing hardware device that can encode and process information in quantum states of light or matter. In some cases, QPUs can be configured to execute quantum algorithms that perform certain computational tasks more efficiently than other types of processors. Some QPUs can be configured to implement a variational quantum eigensolver (VQE), perform a Fourier transform, factor large integers (e.g., Shor's algorithm), simulate a quantum system, perform a search (e.g., Grover's algorithm), estimate quantum phases, or other types of computational tasks. In some examples, QPUs are configured to perform these and other types of operations by leveraging large-scale entanglement and other quantum resources.

In some cases, one or more of the QPUs 202 includes a superconducting circuit, and the qubit devices are implemented as circuit devices that include Josephson junctions, for example, in superconducting quantum interference device (SQUID) loops or other arrangements, and are controlled by radio-frequency signals, microwave signals, and bias signals delivered to the quantum processor cell 102. In some cases, one or more of the QPUs 202 includes an ion trap system, and the qubit devices are implemented as trapped ions controlled by optical signals delivered to the system. In some cases, one or more of the QPUs 202 includes a spin system, and the qubit devices are implemented as nuclear or electron spins controlled by microwave or radio-frequency signals delivered to the system. The QPUs 202 may be implemented based on another physical modality of quantum computing.

In some aspects of operation, one or more of the classical processor unit(s) 201 accesses a computer program to be executed in the computer system 200. The computer program can include computer program code that defines variables and data processing tasks (e.g., functions, routines, etc.). The computer program can be executed in the computer system 200 by delegating data processing tasks to the various processor devices. The data processing tasks may be delegated in series, in parallel, or both, as specified by the computer program or other protocols. For instance, the classical processor unit(s) 201 may delegate computational tasks to the QPUs 202 in series, in parallel, as the QPUs 202 become available, or otherwise.

In some instances, instructions generated by the classical processor unit(s) 201 are configured to cause one of the QPUs 202 to perform a particular function or other data processing task defined in the computer program. The instructions are provided to the QPU 202 through the appropriate interface 204, and the QPU 202 performs the data processing task by executing the instructions generated by the classical processor unit(s) 201. Output values generated by the QPU can then be provided back to the classical processor unit(s) 201 through the interface 204. The classical processor unit(s) 201 can then execute or delegate further operations in the computer program based on the output values from the QPU.

The computer program (which may also be called a program, script, or code) includes computer program code that can be written in any form of programming language, including compiled or interpreted languages, declarative or procedural languages, and it can be deployed in any form, including as a stand-alone program or as a module, component, subroutine, object, or other unit suitable for use in the computer system 200. A computer program may, but need not, correspond to a file in a file system. A program can be stored in a portion of a file that holds other programs or data (e.g., one or more scripts stored in a document), in a single file dedicated to the program in question, or in multiple coordinated files (e.g., files that store one or more modules, sub-programs, or portions of code).

The interfaces 204 can include, for example, connectors, wires, cables, communication interfaces, networks or other systems or components to transfer information between the classical processor unit(s) 201 and the respective QPUs 202. In some cases, the interfaces 204 are implemented as all or part of the signal delivery system 106 in FIG. 1. For instance, the interfaces 204 may connect the respective QPUs 202 to a control system that includes the classical processor unit(s) 201. In some cases, the interfaces 204 may include one or more wired or wireless connections, or one or more wired or wireless networks or other communication channels. For example, the classical processor unit(s) 201 may communicate with the respective QPUs 202 over one or more public or private networks (a Local Area Network (LAN), a Wide Area Network (WAN), a Virtual Private Network (VPN), the Internet, a peer-to-peer network, a cellular network, a Wi-Fi network, or another type of data network. In some aspects of operation, the computer system 200 simulates a quantum system.

In some aspects of operation, the classical processor unit(s) 201 parameterizes a quantum algorithm for execution by a QPU based on the hardware and performance capabilities of the particular QPUs 202 that are available in the system 200. In some instances, the classical processor unit(s) 201 identifies fragments for simulation by particular QPU hardware resources. For example, the classical processor unit(s) 201 may parallelize a simulation into M=8 fragments to be executed by the M=8 QPUs available in the system. In some cases, the classical processor unit(s) 201 parallelizes a simulation into a larger number of fragments to be executed in multiple iterations of parallel iteration by the M=8 QPUs available. As another example, each of the QPUs may have a different number of qubits available, with the i-th QPU having $N_i$-qubit computational power. In such cases, the classical processor unit(s) 201 may define fragments that utilize the full computing power of each QPU. As such, the classical processor unit(s) 201 can identify fragments having a dimension that is matched to the computing resources (e.g., number of qubits) of each respective QPU. These and other techniques can be used to adapt a quantum simulation to the specific hardware (including the specific size, speed, and resources of each QPU) available in the computing system 200.

Figure 3:
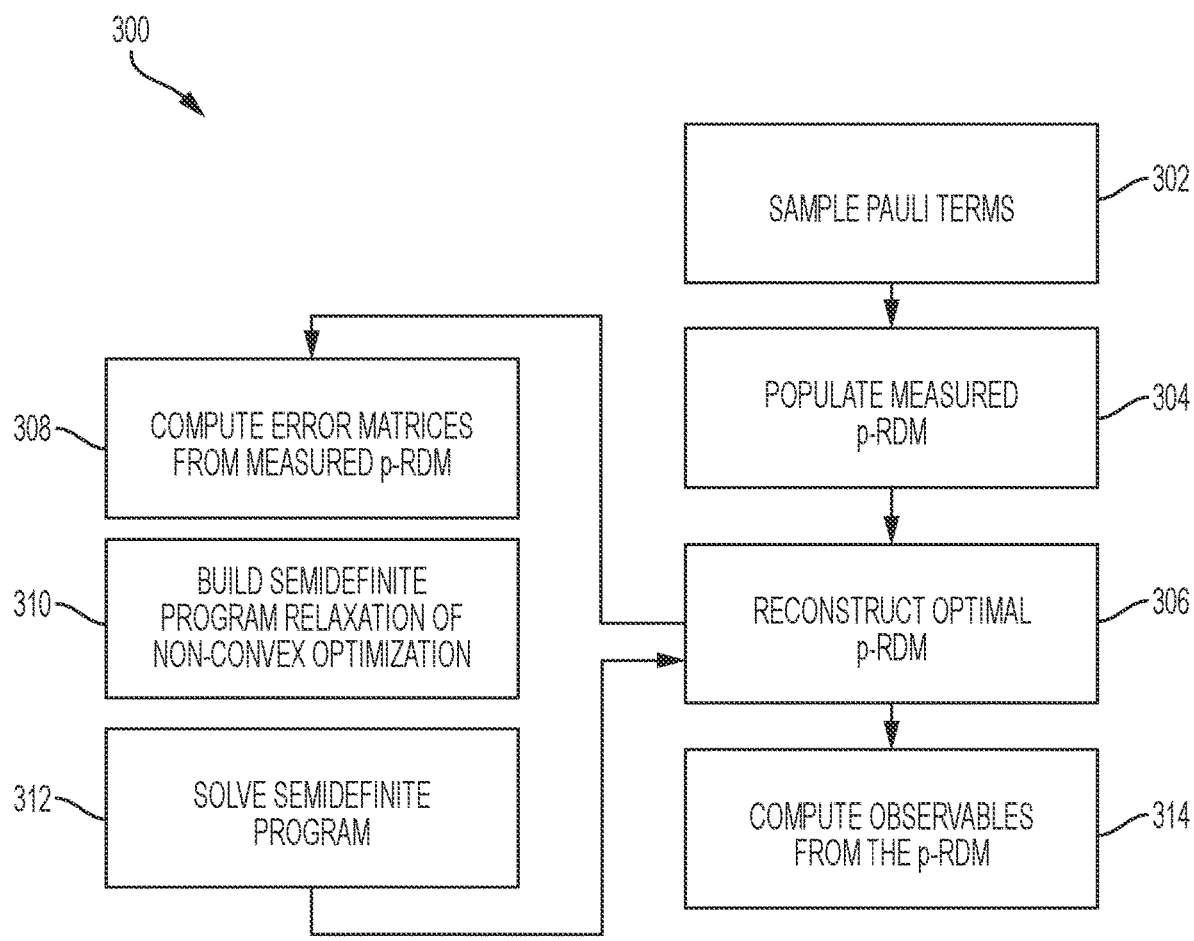
FIG. 3 shows a flow diagram of an operator averaging technique where expectation values of p-local operators are calculated by reconstructing the p-local reduced density matrix (RDM).

FIG. 3 shows a flow diagram of the operator averaging technique where expectation values of p-local operators are calculated by reconstructing the p-local RDM. At 302, Pauli terms can be sampled. At 304, measured p-RDMs can be populated. At 306, optimal p-RDMs can be reconstructed. As a part of the reconstruction of the optimal p-RDM, operations 308, 310, and 312 can be undertaken. In particular, at 308, error matrices can be computed from measured p-RDMs. At 310, a semidefinite program relaxation of non-convex optimization can be built. At 312, the semidefinite program can be solved. At 314, observables can be computed from the p-RDMs.

Figure 4:
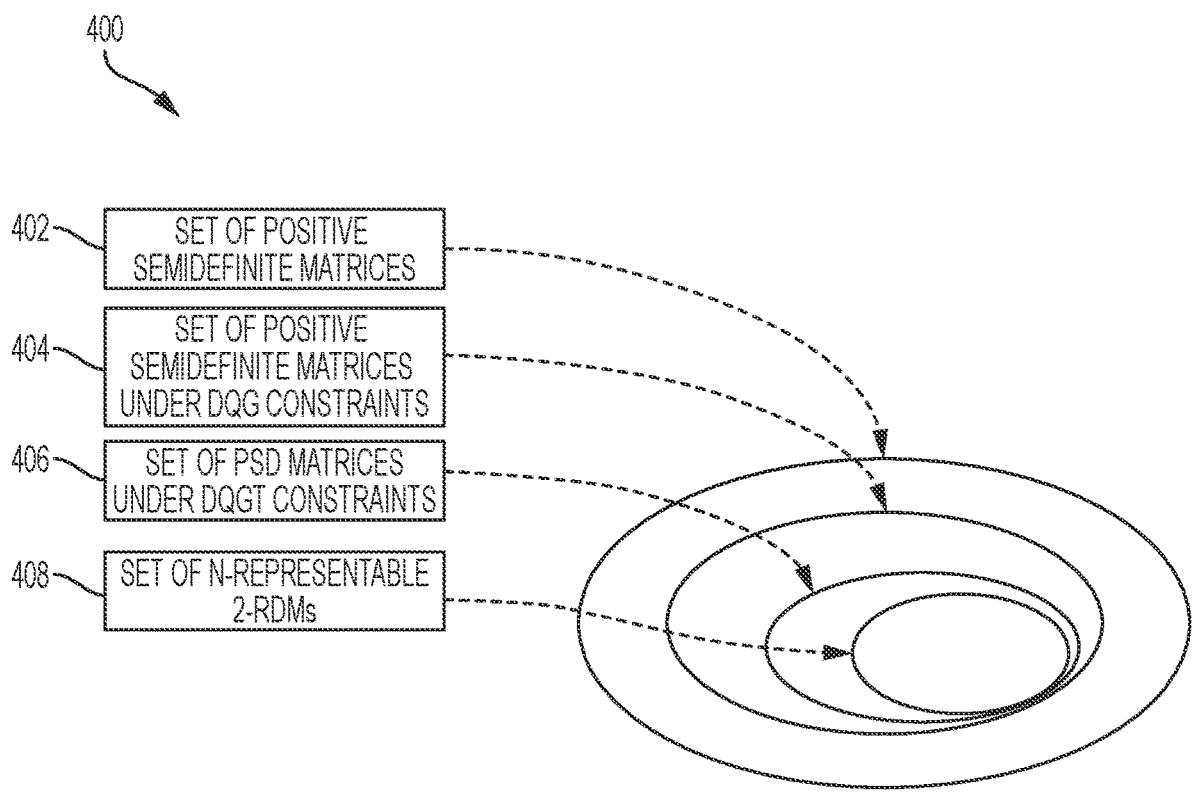
FIG. 4 shows a diagram 400 of spaces of convex sets.

FIG. 4 shows a diagram 400 of spaces of convex sets. Region 402 represents the set of positive semidefinite matrices. Region 404 represents the set of positive semidefinite matrices under (2,2)-positivity (DQG) constraints. Region 406 represents the set of positive semidefinite matrices under and (2,3)-positivity (DQGT) constraints. Region 408 represents the set of n-representable 2-RDMs. As shown in FIG. 4, the regions get progressively smaller from 402 to 404 to 406 to 408, showing that the sets get progressively smaller (and closer to the real n-representable set) as the n-representability approximation improves.

Figure 5:
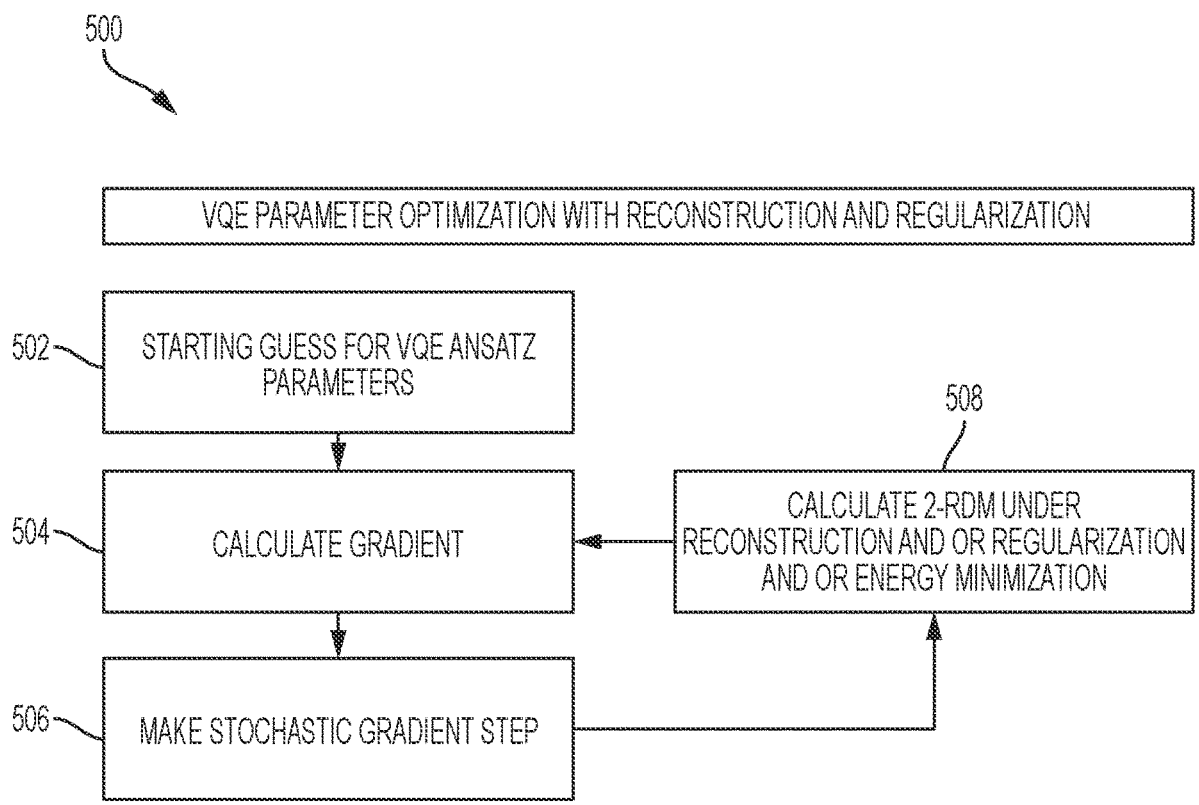
FIG. 5 shows a diagram of an optimization procedure for use in a variational quantum eigensolver (VQE) technique.

FIG. 5 shows an optimization procedure for the parameters of a wavefunction ansatz in the variational quantum eigensolver (VQE). In particular, diagram 500 represents a diagram for VQE parameter optimization with reconstruction and regularization. At 502, a starting guess for VQE ansatz parameters can be made. At 504 a gradient can be calculated. At 506, a stochastic gradient step can be made. At 508, a 2-RDM can be calculated under reconstruction and/or regularization and/or energy minimization. The output of 508 can be fed back into 504.

Figure 6:
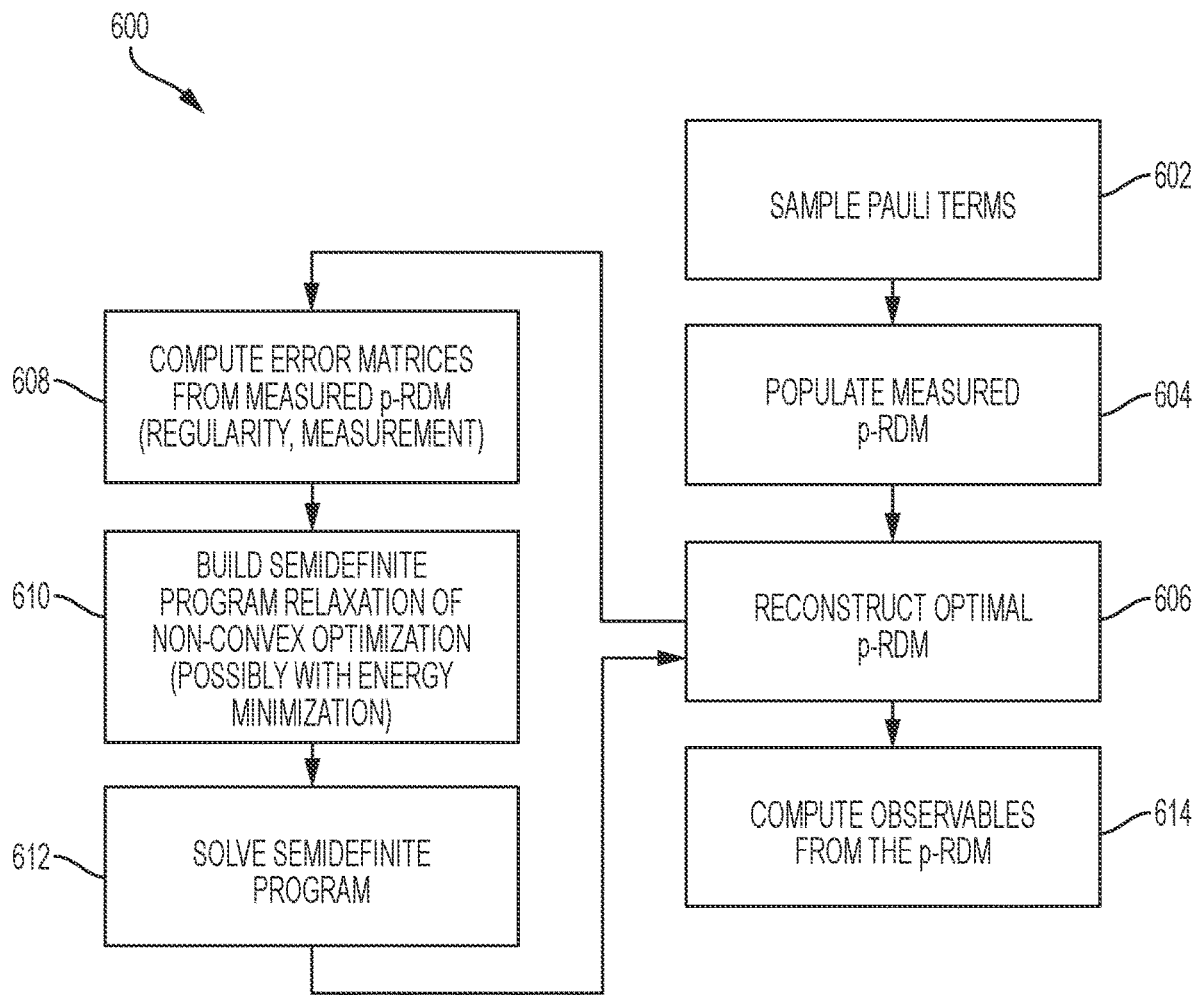
FIG. 6 shows a diagram of a reconstruction procedure for use in connection with the disclosure.

FIG. 6 shows the reconstruction procedure with the addition of regularization. At 602, Pauli terms can be sampled. At 604, measured p-RDMs can be populated. At 606, optimal p-RDMs can be reconstructed. As a part of the reconstruction of the optimal p-RDM, operations 608, 610, and 612 can be undertaken. At 608, error matrices can be computed from measured p-RDMs, for example, under regularization and/or measurement considerations. At 610, a semidefinite program relaxation of non-convex optimization can be built. The semidefinite program relaxation can be built with energy minimization. At 612, the semidefinite program can be solved.

Quantum computers may provide an exponential speedup in the solution of the electronic structure problem. This may improve research in chemistry and material science by enabling the design of materials, drugs, and catalysts.

In some aspects, the development of quantum hardware has led to development of algorithms that do not necessarily need fault-tolerant quantum computers. Practical algorithms on a pre-threshold device can include quantum/classical hybrid algorithms, such as the variational quantum eigensolver (VQE) for chemistry and the quantum approximate optimization algorithm (QAOA) for optimization problems. Further, quantum-classical feedback may provide robustness against noise in the device, and extensions can be possible that allow for further dampening of the noise through additional measurements.

One step for such algorithms can include the determination of an operator's expected value through a form of partial tomography of the quantum state. In an aspect, the statistical criteria relating the number of measurements from the distribution and the accuracy of the expected value can be determined. In another aspect, the benchmark for this accuracy can be $\langle H \rangle \pm \varepsilon$ Hartree, where $\varepsilon = 1.6 \times 10^{-3}$ can refer to chemical accuracy and $\pm \varepsilon$ can express a standard confidence interval. This accuracy may be needed for matching experimentally determined thermochemical properties, such as heats of formation or ionization potentials. Naturally, this accuracy on the estimator for the Hamiltonian may require a relatively large number of independent preparations of a state and subsequent measurements.

In another aspect, some routes to reduce the number of experiments can include collecting Hamiltonian terms into commuting groups and dropping Hamiltonian terms with small coefficients. For example, simulating the energy of ferrodoxin using this approach may require $10^{19}$ total measurements. Described herein include techniques to accelerate the operator averaging step of VQE and other hybrid algorithms.

In one implementation, the structure in the marginals of the fermionic density matrices can be used to reduce the needed measurements. The set of necessary conditions on marginals of density matrices can be referred to as n-representability conditions and can be used so that the reduced density matrices of fermionic and bosonic systems are the computational variable instead of the wavefunction. In another implementation, the disclosure can describe fermionic systems with pairwise interactions and thus use constraints on the 2-marginal $^2D$. In some respects, the disclosure can be applied to problems with local Hamiltonian objectives, such as many instances of QAOA. Measuring the marginals of a state p, specifically the fermionic two-particle reduced-density-matrix (2-RDM), can provide an extension to VQE. These quantities can be used for connecting VQE to other quantum chemical techniques such as multiconfigurational self-consistent field (MCSCF), embedding procedures such as density matrix embedding theory, and augmenting the accuracy of electronic structure methods with perturbation theory.

In some implementations, the disclosure describes measuring marginals, for example, instead of directly measuring the Hamiltonian, and describes how the n-representability constraints on the marginals can provide i) a program for reducing the norm of the Hamiltonian directly leading to fewer measurements and ii) using the set of necessary, but not sufficient constraints, on the fermionic marginals, known as p-positivity constraints, to describe two computational procedures for projecting measured marginals into the set of allowed marginals. For example, the variance reduction that can be applied for linear hydrogen chains and can show an order of magnitude reduction in the number of measurements.

In some implementations, the disclosure describes a series of polynomial time post-processing techniques for certifying and projecting measured marginals. This computational procedure can be similar to maximum likelihood tomography except on a reduced density matrix space, thus making the procudure efficient.

In another implementations, four projection techniques can be compared against each other, the techniques having various tradeoffs between enforcing n-representability with computational efficiency. Some techniques can be based on positive projection of the 2-RDM matrix-which may be positive semidefinite—but does not necessarily include any constraints beyond positivity of the 2-RDM and fixing the trace. Other techniques can add approximate n-representability constraints implemented through a more computationally expensive iterative procedure and semidefinite program.

The disclosure describes fermionic marginals and the n-representability conditions, describes the utility of marginals as they pertain to perturbation theory, and describes the 2-RDM projection procedures and how they can reduce the number of measurements to measure to fixed accuracy E and also restore physicality after state corruption by certain error channels. Accordingly, the disclosure descvribes n-representability techniques that can improve hybrid algorithms.

In various aspects, the terminology and set notation with respect to reduced density matrices, or marginals of the full density, in both the qubit and fermionic setting is described. A marginal of a multivariable probability distribution can be the partial trace, or integration, of a subset of the variables leaving a distribution on a smaller set of variables. In an aspect, given a general quantum state $\rho$ on n qubits $$\rho = \Sigma_i w_i |\psi_i\rangle\langle\psi_i| \tag{1}$$

where $|\psi_i\rangle$ are pure states of n qubits and $\Sigma_i w_i = 1$, the set of p-qubit reduced-density matrices, or p-marginals, of the state can be determined by integrating out q-qubits (such that n−q=p) of the joint distribution as $$^p\rho_{m_1,\ldots,m_p} = Tr_{n_1,n_2,\ldots,n_q}[\rho] \tag{2}$$

resulting in $$\binom{n}{p}$$

different marginals each of dimension $2^p \times 2^p$. The coefficients $n_1, \ldots, n_q$ on the trace operator can indicate which qubits are integrated out of $\rho$ and coefficients $m_1, \ldots, m_p$ label the subsystem marginal. The result of marginalization can be a distribution on the state space of p-qubits. In another aspect, these objects can interchangeably be referred to as marginals and reduced-density matrices (RDMs) since, like the von Neumann density matrix the marginals can be expressed as a sum $$^p\rho_{m_1,\ldots,m_p} = \Sigma_j w_j |\phi_j\rangle\langle\phi_j| \tag{3}$$

where $|\phi_j\rangle$ is a pure state on the subsystem of qubits that has not been traced out.

This $$\binom{n}{p}$$

set of marginals can be sufficient for calculating the expected value of a p-local Hamiltonian or other observables. In an aspect, a p-local Hamiltonian can be a Hamiltonian where any term in the Hamiltonian involves no more than p-qubits interacting. In another implementation, such a description of a quantum system can be a computationally-feasible polynomial size representation. However, in order to use the set of marginals as computational objects (e.g. minimize energy with respect to them) rather than simply measuring them, the RDMs may need to satisfy certain constraints to ensure physicality. These constraints can be referred to as "consistency" and can include the requirement that the marginals satisfy Eq. (2) for the same initial state $\rho$. Despite the structure on $^p\rho_{m_1,\ldots,m_p}$, confirming that a set of marginals are consistent can be demonstrated to be QMA-complete. Described herein include a different form of consistency, or approximation, that makes working with marginal distributions a computationally-feasible approach.

Analogous to the case of qubits, calculating expected values of k-local operators describing interactions of indistinguishable particles, such as fermions or bosons, may only require the k-marginal. In an implementation, p-local qubit operators can refer to operators acting on at most p qubits. In another aspect, k-local fermionic operators can refer to interactions that derive from k-body interactions, and generically act on 2k fermionic modes. This can represent a difference between chemistry and quantum computation. As an example, in chemical systems the energy can be a functional of the 1- and 2-local fermionic operators and the 2-marginal of the system. For example, a Fock space can be constructed with a single particle basis associated with a Hilbert space $\mathcal{H}$ of size m. A general state on this space can be represented as, $$|\psi\rangle = \sum_{i_1,\ldots,i_m=0}^{1} c_{i_1,\ldots,i_m} (a_m^\dagger)^{i_m}(a_{m-1}^\dagger)^{i_{m-1}} \ldots (a_1^\dagger)^{i_1} |vac\rangle \tag{4}$$

where each fermionic creation operator $\{\alpha_m^\dagger\}$ can be associated with a single particle basis state $|\phi_m\rangle$ and $|vac\rangle$ is the vacuum. A state $\psi$ with fixed particle number n can be enforced by restricting the coefficients $i_m$ in Eq. (4) to satisfy $\Sigma_m i_m = n$. In another aspect, once an ordering of fermions is selected the Fock space states can be mapped to a Hilbert space of m-distinguishable spin-½ particles. Marginals of the fermionic n-particle density matrix $$^nD = |\psi\rangle\langle\psi| = ^nD_{j_1,\ldots,j_n}{}^{i_1,\ldots,i_n}|i_n\ldots i_1\rangle\langle j_n\ldots j_1| \tag{5}$$

can involve integrating out particles by a trace operation. For example, the 2-RDM $^2D$ can be obtained from $^nD$ by integrating out particles 3 to n.

$$^2D = Tr_{3\ldots n}[^nD]. \tag{6}$$

In another implementation, the normalization constant for $^pD$ can be scaled to $$\binom{n}{p}$$

when $i_1 < i_2 < \ldots < i_p$ or $n!/(n-p)!$ when $i_k$ is allowed to be range over all values in [1, m].

In one implementation, based on n-representability theory, a number of efficiently implementable and necessary constraints on the one- and two-particle marginals ($^1D$ and $^2D$) can be described. Specifically, defining $$^1D = \Sigma_{ij} {}^1D_j{}^i|i\rangle\langle j| \tag{7}$$

$$^2D = \Sigma_{pq,rs} {}^2D_{rs}{}^{pq}|pq\rangle\langle rs| \tag{8}$$

where $$^1D_j{}^i = Tr[a_i^\dagger a_j {}^ND] = \langle\psi|a_i^\dagger a_j|\psi\rangle \tag{9}$$

$$^2D_{rs}{}^{pq} = Tr[a_p^\dagger a_q^\dagger a_s a_r {}^ND] = \langle\psi|a_p^\dagger a_q^\dagger a_s a_r|\psi\rangle \tag{10b}$$

These constraints can include the following. Hermiticity of the density matrices:

$$^1D_j{}^i = (^1D_j{}^i)^* \tag{11}$$

$$^2D_{rs}{}^{pq} = (^2D_{pq}{}^{rs})^* \tag{12}$$

Antisymmetry of the 2-particle marginal:

$$^2D_{rs}{}^{pq} = -^2D_{rs}{}^{pq} = -^2D_{rs}{}^{qp} = {}^2D_{sr}{}^{qp} \tag{13}$$

In one implementation, the (p−1)-marginal can be related to the p-marginal by contraction. For example, the 2-marginal can be contracted to the 1-marginal $$^1D_j^i = \frac{1}{n-1}\sum_k {}^1D_{jk}^{ik} \tag{14}$$

The trace of each marginal can be fixed by the number of particles in the system $$Tr[^1D]=n \quad (15)$$

$$Tr[^2D]=n(n-1) \quad (16)$$

In another aspect, the marginals can be proportional to density matrices and can be positive semidefinite $$\{^1D,^2D\} \succcurlyeq 0 \quad (17)$$

Additional constraints based on the quantum numbers of $S^2$ and $S^z$ operators can be derived for the marginals. A short description of the form of the linear constraints including a fixed particle number $\langle n \rangle$, fixed total angular momentum $\langle S_2 \rangle$, and fixed projected total angular momentum $\langle S_z \rangle$ will be described herein.

In various implementations, a framework is described that allows one to derive the full set of representability conditions for fermionic systems, from which one may select a subset to form efficient approximations. In another aspect, the polynomial size of the p-marginals can facilitate their use as the representation of quantum systems.

In some implementations, a geometric picture of the constraints within the space of fermionic density matrices can be described. The formal characterization of the n-representable set of $^2D$ operators can include characterizing the polar cone of the 2-marginals. In another aspect, the convex set of 2-marginals $^2\mathcal{D}$ acting on the anti-symmetric two-fermion space $^{\wedge 2}\mathcal{H}$ may be defined in terms of its basis vectors $\{a^{\wedge}b = a\otimes b - b\otimes a\}$ for $a, b \in \mathcal{H}$. In another aspect, the polar cone can be defined as the subset of Hermitian operators that satisfy the positive projection condition, $$^2\tilde{\mathcal{D}} = \{^2B \in {}^{\wedge 2}\mathcal{H} \mid \langle {}^2B \mid {}^2D \rangle \geq 0 \forall {}^2D \in {}^2\mathcal{D}\} \quad (18)$$

In some implementations, operators of the polar cone $^2B \in {}^2\tilde{\mathcal{D}}$ can be positive operators with respect to the 2-RDM, which may imply their non-negativity with respect to fermionic density matrices $^ND$ when lifted to the n-particle space. In another aspect, this lifting procedures can be accomplished by taking the tensor product of the operator with identities. For fermions, the lifting procedure can involve the tensor product with the appropriate antisymmeterization operations.

The bipolar theorem states that elements of $^2\mathcal{D}$ are completely characterized by the polar cone $^2\tilde{\mathcal{D}}$ $$^2\mathcal{D} = \{^2D \in {}^{\wedge 2}\mathcal{H} \mid \langle {}^2B \mid {}^2D \rangle \geq 0 \forall {}^2B \in {}^2\tilde{\mathcal{D}}\}. \quad (19)$$

Though specification of inequalities with elements of the polar cone can provide a characterization of $^2\mathcal{D}$, a) there may be infinitely many possible $^2B$ operators to check and b) checking $^2B$ may involve checking if an exponentially large operator is positive.

In one aspect, a polynomial size approximation to the polar cone $^2\tilde{\mathcal{D}}_a$ can be constructed using n-representability and deriving conditions on the 2-marginal through Eq. (18). In another aspect, a kth-order (where k<n) operator basis can be selected for $^2\tilde{\mathcal{D}}_a$. Given that the $^2\tilde{\mathcal{D}}_a \subset {}^2\tilde{\mathcal{D}}$ representability conditions derived from $^2\tilde{\mathcal{D}}_a$ can be an approximate set of representability conditions. By duality, the polar of $^2\tilde{\mathcal{D}}_a$ implies $^2\mathcal{D} \subset {}^2\mathcal{D}_a$. This can explain why variational calculations using the reduced-density matrix and approximate n-representability constraints can be a lower bound to the energy.

In using n-representability to simulate fermions, fermionic operators up to a particular order—e.g. $\{a_i, a_i^\dagger, a_ia_j, a_i^\dagger a_j^\dagger, \ldots\}$ can be used as the operator basis for the approximate polar cone. Given a rank-k operator basis for the polar cone, a real linear space of Hermitian operators $O_k^\dagger O_k$ can be defined where $$O_k = \sum_{k=1}^N \sum_{j=1, o \in \{1, \dagger\}}^k c_{kj} \hat{a}_{kj}^o \quad (20)$$

that when constrained to be non-negative (implied by Eq. (18)) form a necessary set of conditions on the p-marginals of the von Neumann density matrix.

For example, the 2-positivity conditions can be obtained by restricting the rank of the monomials in the operator basis to rank less than 2 as $$O_2 = \Sigma_i c_i^a \hat{a}_i + \Sigma_i c_i^b \hat{a}_i^\dagger + \Sigma_{ij} c_{ij}^c \hat{a}_i \hat{a}_j + \Sigma_{ij} d_{ij}^d \hat{a}_i^\dagger \hat{a}_j + \Sigma_{ij} c_{ij}^e \hat{a}_i^\dagger \hat{a}_{ij} + \Sigma_{ij} c_{ij}^f \hat{a}_i^\dagger \hat{a}_j^\dagger, \quad (21)$$

by setting $$M_2 = O_2^\dagger O_2, \quad (22)$$

and requiring that $M_2 \succcurlyeq 0$. The $\{c\}$ coefficients in Eq. (21) can specify an arbitrary element of the approximate polar cone $^2\tilde{\mathcal{D}}_a$ in a similar fashion to how a sum-of-squares polynomial can be expressed as a quadratic form $c^T Ac$ where elements of A represent various products of monomials. In one implementation, symmetries of the system, such as fixed particle number, can allow for the reduction of the large matrix $M_2$ to a block diagonal matrix. In one respect, the disclosure can describe spinless fermionic Hamiltonians that commute with the number operator of a system and thus $M_2$ can be decomposed into blocks where monomials correspond to number preserving operators—i.e. $\{a_i^\dagger a_j, a_j^\dagger a_i, \ldots\}$. Restricting the operator $M_2$ to be non-negative against the 1-RDM and 2-RDM for all values of c can yield the following inequalities $$\Sigma_{ij} c_i c_j^* \langle \psi | a_j^\dagger a_i | \psi \rangle \geq 0 \quad (23)$$

$$\Sigma_{ij} c_i c_j^* \langle \psi | a_j a_i^\dagger | \psi \rangle \geq 0 \quad (24)$$

$$\Sigma_{ij,kl} c_{ij} c_{kl}^* \langle \psi | a_i^\dagger a_j^\dagger a_l a_k | \psi \rangle \geq 0 \quad (25)$$

$$\Sigma_{ij,kl} c_{ij} c_{kl}^* \langle \psi | a_i a_j a_l^\dagger a_k^\dagger | \psi \rangle \geq 0 \quad (26)$$

$$\Sigma_{ij,kl} c_{ij} c_{kl}^* \langle \psi | a_i^\dagger a_j a_l^\dagger a_k | \psi \rangle \geq 0 \quad (27)$$

where $\psi$ is an arbitrary state. These conditions can imply that the following matrices are positive semidefinite $$^1D = \langle \psi | a_j^\dagger a_i | \psi \rangle \succcurlyeq 0 \quad (28)$$

$$^1Q = \langle \psi | a_j^\dagger a_i | \psi \rangle \succcurlyeq 0 \quad (29)$$

$$^2D = \langle \psi | a_j^\dagger a_i a_k | \psi \rangle \succcurlyeq 0 \quad (30)$$

$$^2Q = \langle \psi | a_i a_j a_l^\dagger a_k^\dagger | \psi \rangle \succcurlyeq 0 \quad (31)$$

$$^2G = \langle \psi | a_i^\dagger a_j a_l^\dagger a_k | \psi \rangle \succcurlyeq 0 \quad (32)$$

In some aspects, the positivity of these matrices can be referred to as $\{^1D, {}^1Q, {}^2D, {}^2Q, {}^2G\}$ and can form a set of conditions that the 2-marginal satisfy. As the 2-marginal is included in the set, the positivity of this operator appears when building constraints starting from a polar cone picture. Though these constraints can be formulated with pure states, these conditions hold for mixed states as well.

In an implementation, the positivity of the operators on $\mathcal{H} - \{^1D, {}^1Q\}$—and $^{\wedge 2}\mathcal{H} - \{^2D, {}^2Q, {}^2G\}$—can be constrained to live in the space defined by equalities obtained by rearranging the fermionic ladder operators according to their anticommutation rules. In this disclosure, the positivity constraints and the linear constraints from the anticommutation relationships can be used as a set of constraints that 2-RDMs measured from a quantum resource satisfies. This can enhance the accuracy of estimation of desired quantities.

In some implementations, n-representability conditions can be used to improve 2-RDMs sampled from a quantum device. Errors in the 2-RDM measured from a quantum state can appear in multiple ways, such as: 1) stochastic errors associated with the operator averaging techniques used to measure expected values and 2) device errors such as unexpected measurement correlations. Described herein includes the use of 2-marginal reconstruction schemes using n-representability rules to remove stochastic errors associated with sampling and state errors, where the errors correspond to noise of the device and can corrupt the intended state.

In an implementation, a process is described that projects a 2-RDM back into the set of n-representable 2-RDMs while accounting for data-collection time and classical post-processing time. Accordingly, procedures are described that involve positive-semidefinite projection of the measured 2-RDM with and without fixed-trace. These procedures are compared against procedures involving projections with knowledge of representability constraints.

In one aspect, the n-representability rules can enforce the 2-RDM to be Hermitian and non-negative with fixed trace. Given a measured 2-RDM, a computational procedure can be described that determines the closest positive-semidefinite matrix:

$$\min \|{}^2D - {}^2D_{measured}\|_2 \tag{33}$$

$$\text{s. t. } {}^2D \succeq 0 \, Tr[{}^2D] = n(n-1) \tag{34}$$

The normalization can be fixed by the particle number of the system. In another aspect, without the trace condition the 2-RDM that minimizes the objective in Eq. (33) is the marginal constructed from the non-negative eigenvalues and eigenvectors of ${}^2D_{measured}$. In some aspects, the described projection procedure can have increased computational simplicity but may not include the representability conditions. Therefore, given a sufficiently corrupted ${}^2D_{measured}$, physicality may not be guaranteed after projection.

In some aspects, to improve the projection criteria additional n-representability constraints can be added to the minimization procedure outlined in Eq. (33). Given a collection of 2-RDM elements at some unknown precision, or possibly missing crucial elements, the disclosed reconstruction scheme can minimize the Frobenius norm of the difference between the reconstructed 2-RDM and the set of known measurements subject to approximate n-representability constraints. Denoting E to be the difference between the reconstructed 2-RDM and ${}^2D_{measured}$, the minimization procedure can be formulated as the following non-convex optimization problem:

$$\min \|E\|_F^2 \tag{58}$$

$$\text{s. t. } Tr[{}^2D] = n(n-1)$$

$$\{{}^1D, {}^1Q, {}^2D, {}^2Q, {}^2G\} \succeq 0$$

$$A_1({}^1D) \to {}^1Q, A_2({}^2D) \to {}^1D \tag{59}$$

$$A_3({}^2D) \to {}^2Q, A_4({}^2D) \to {}^1G \tag{59}$$

where $A_i$ is the map from one marginal to another in connection with the fermionic ladder operator algebra. The squared Frobenius norm of the error $\|E\|_F$ can be quadratic in 2-RDM. In one aspect, the optimization problem specified in Eq. (58) can be relaxed to a semidefinite program (SDP) by taking the Schur complement in the identity block of the large matrix M $$M = \begin{pmatrix} I & E \\ E^\dagger & F \end{pmatrix} \succeq 0$$

constrained to be positive-semidefinite. In M, I is the identity matrix, F is a matrix of free variables, and E is the error between the reconstructed ${}^2D$ and the ${}^2D_{measured}$. Taking the Schur complement in the identity block of M gives $$F - E^\dagger E \succeq 0 \tag{35}$$

or $$F \succeq E^\dagger E. \tag{36}$$

In one aspect, the Frobenius norm of a matrix A, $\|A\|_F$, can be given as $\sqrt{Tr[{}^\dagger A]}$; therefore, taking the trace of Eq. (36) gives the semidefinite relaxation of minimizing the Frobenius norm $$Tr[F] \succeq Tr[E^\dagger E] \tag{37}$$

$$\|E\|_F^2 = Tr[E^\dagger E]. \tag{38}$$

Accordingly, in some aspects, the non-convex RDM reconstruction scheme in Eq. (58) can be described in terms of a semidefinite program:

$$\min Tr[F] \tag{39}$$

$$\text{s.t.} \{{}^1D, {}^1Q, {}^2D, {}^2Q, {}^2G, M\} \succeq 0$$

$$A_1({}^1D) \to {}^1Q, A_2({}^2D) \to {}^1D$$

$$A_3({}^2D) \to {}^2Q, A_4({}^2D) \to {}^1G$$

$$A_5({}^2D) \to M, A_6({}^2D) \to n(n-1)$$

$$A_7({}^2D) \to {}^2D \tag{40}$$

where $A_i$ are the linear maps between ${}^2D$ and the other matrices $\{{}^1D, {}^1Q, {}^2D, {}^2Q, {}^2G, M\}$ along with the trace constraint and antisymmetry constraint on ${}^2D$. These maps can be described explicitly below and can be used for an SDP reconstruction program.

Although the SDP projection procedure can be extended to include better approximate n-representability conditions, it may need to be solved using a semidefinite program. Despite the fact that an SDP can be solved in polynomial time with respect to the total number of variables and constraints, the high-order polynomial scaling of SDP algorithms may make the SDP-based project method infeasible for on-the-fly or online projections. An alternative to the SDP projection combines the faster projection techniques based on fixed-trace positive projection with augmented n-representability conditions.

The projection technique can represent an iterative procedure that was originally developed to enforce approximate n-representability on 2-RDMs obtained through a response formalism. In one aspect, the algorithm involves sequentially mapping ${}^2D$ to ${}^2Q$ to ${}^2G$ and enforcing the positivity and trace constraints at each of the operators. One of the algorithm's drawbacks can be that any representable 2-RDM is a valid fixed point. As a result, linear constraints on the 2-RDM preserving projected spin and total spin expectation values are not necessarily enforced and therefore, there may be no guarantee that the ${}^2D$ obtained from the iterative procedure is any closer to the true 2-RDM. Therefore, it is likely required that the input 2-RDM measured from the quantum resources be sufficiently close to the true 2-RDM for this procedure to be successful.

In one aspect, the algorithm can enforce Hermiticity of the given 2-RDM matrix by averaging $$^2D^s = \frac{1}{2}(^2D_{meas} + {}^2D^\dagger_{meas}), \tag{41}$$

followed by a positive projection with fixed trace. In another aspect, given a system with r spin orbitals, n particles, and η=r−n holes, the iterative projection algorithm can be as follows:
1. Enforce Hermiticity of $^2D$ and project to positive set with trace n(n−1)
2. Map $^2D$ to the $^2Q$
3. Enforce Hermiticity of $^2Q$ and project to positive set with trace η(η−1) where η is the number of holes
4. Map $^2Q$ to $^2G$
5. Enforce Hermiticity of $^2G$ and project to the positive set with trace n(η+1)
6. Check the stopping condition associated with fixed trace for $^2D$, $^2Q$, and $^2G$ and positivity of their eigenvalues The iterative procedure can be considered converged when the largest negative eigenvalue of any marginal in the 2-positive set is below a set threshold. The total algorithm is depicted in FIG. 7.

Figure 7:
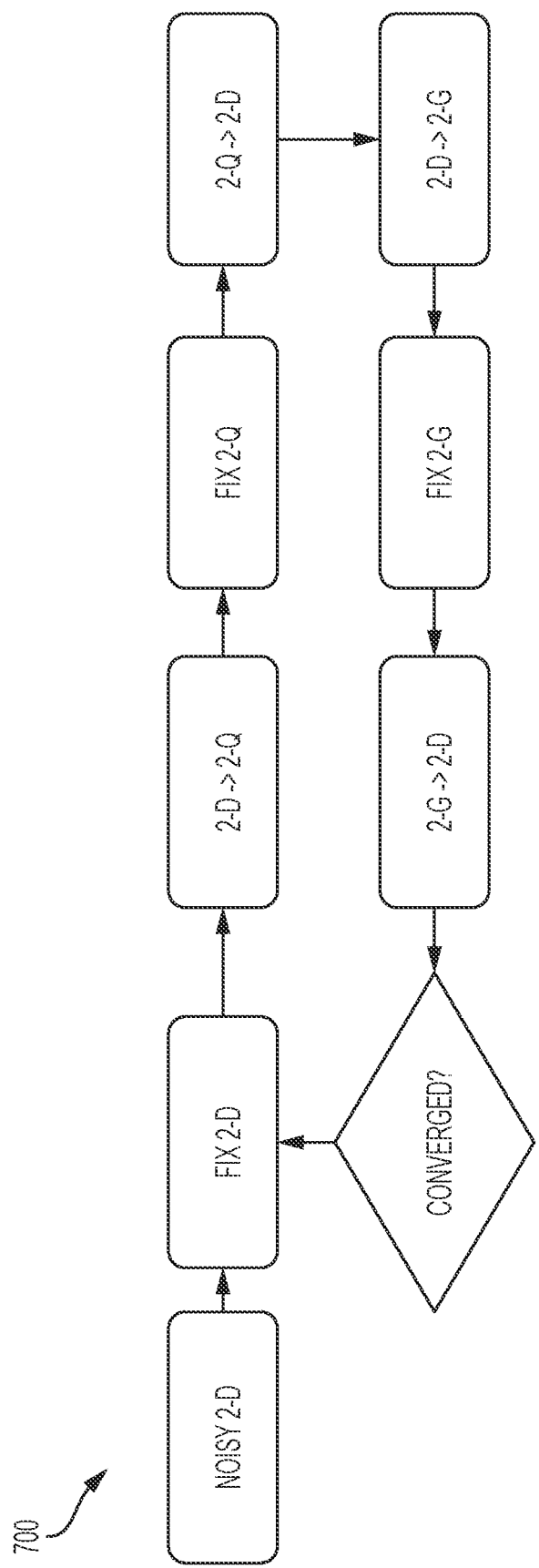
FIG. 7 shows a diagram of an iterative procedure for use in connection with the disclosure.

In particular, FIG. 7 shows a diagram 800 that represents the iterative procedure for 2-positive approximate n-representability constraints. In one aspect, starting with a noisy 2-RDM the flow diagram can be followed until the largest non-negative eigenvalue falls below a set threshold. Eigenvalues can be considered converged when the absolute value of the largest negative eigenvalue is less than $1.0 \times 10^{-7}$. This stopping criteria can be used for numerical experiments with the 2-positive iterative scheme.

In some aspects, to probe the utility of the n-representability inspired reconstruction schemes, the accuracy of the energy and chemical properties obtained from 2-RDMs with simulated sampling noise for diatomic hydrogen and a linear four-hydrogen chain can be determined. In another aspect, the experiments involved corrupting the elements of a pure-state 2-RDM with Gaussian noise proportional to the amount of samples used in operator averaging, followed by reconstructing the corrupted marginal with the four projection procedures outline above. The accuracy and precision of the reconstructed energies, particle-number, projected spin expectation $\langle S_z \rangle$, and total spin $\langle S^2 \rangle$ can be compared to provide the noise tolerance and precision of the various reconstruction schemes.

The Hamiltonian and ground-state wavefunction for diatomic hydrogen and a linear four-hydrogen chain with a bond length of 0.75 Å described with an STO-3G basis can be obtained using an OpenFermion and the OpenFermion-Psi4 plugin, which are opensource software for compiling and analyzing quantum algorithms. One hundred different corrupted RDMs can be constructed by applying zero-mean Gaussian noise with variance $\varepsilon^2$ $$^2D_{rs}{}^{pq}_{measured} = {}^2D_{rs}{}^{pq} + \mathcal{N}(0, \varepsilon^2). \tag{42}$$

In one aspect, this error model can be bias-free because the energy is linearly proportional to the 2-RDM and has variance proportional to the error added to the 2-RDM elements. For each of the one hundred corrupted density matrices a projected 2-RDM with the positive projection, positive projection with fixed-trace, SDP n-representability reconstruction, and iterative n-representability projection techniques can be determined. For the different methods the mean-square-error (MSE) of the aforementioned observables over the projected 2-RDMs as a function of the noise parameter ε can be determined.

Figure 8:
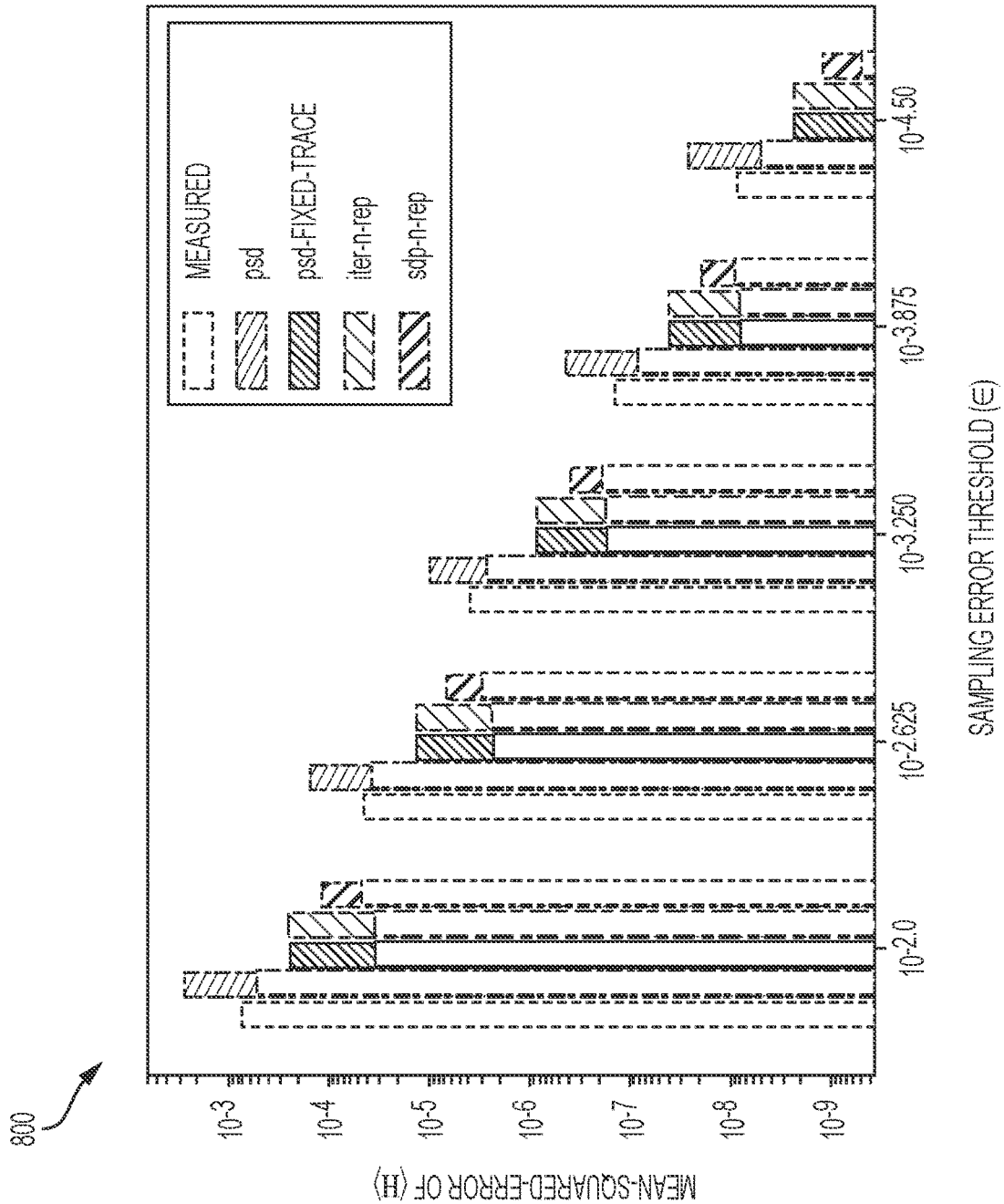
FIG. 8 shows a plot of the mean-squared-error (MSE) of an energy estimator(s) of the energy of diatomic hydrogen at equilibrium bond distance decomposed into its variance and bias components.
Figure 9:
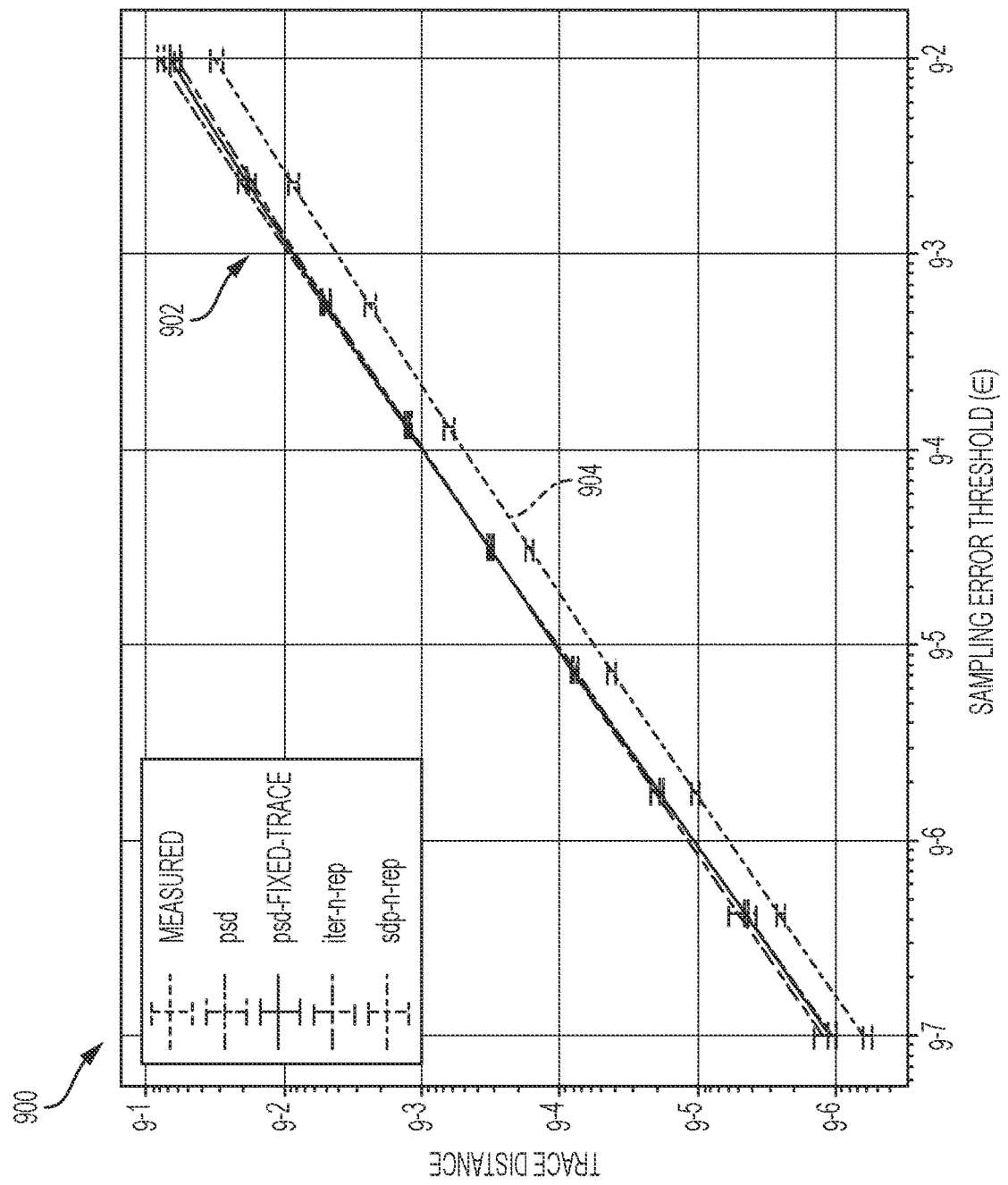
FIG. 9 shows a plot of the average trace distance of the reconstructed 2-RDMs from the true 2-RDM for a 8-qubit 4 hydrogen linear chain at equilibrium bond distance.

FIG. 8 shows a plot 800 of the mean-squared-error (MSE) of an energy estimator(s) of the energy of diatomic hydrogen at equilibrium bond distance decomposed into its variance and bias components. FIG. 9 shows a plot 900 of the average trace distance of the reconstructed 2-RDMs from the true 2-RDM for a 8-qubit 4 hydrogen linear chain at equilibrium bond distance. The solid bars in the MSE plot 800 can represent the squared bias component of the MSE while the transparent bars are the variance component. In one aspect, the n-representability projection techniques described herein can decrease the variance of the energy estimator but may introduce a bias. The expected value for $S_z$, $S^2$, and n shows zero mean-squared-error for the SDP-based projection technique because these values can be added as constraints to the semidefinite program. In one aspect, the correction of the three aforementioned expected values can be referred to as restoration of physicality—i.e. the particle number expectation can be what is expected for an isolated system. The reduced trace distance for the SDP projected 2-RDMs for $H_4$ can indicate that the physicality constraints can be used for removing errors from 2-RDMs measured from a quantum resource.

The first cluster starting from the left of diagram 800 can represent, from left to right, the MSE of <H> for a measured, psd, psd-fixed-trace, inter-n-rep, and sdp-n-rep techniques, respectively. The second cluster starting from the left of diagram 800 can represent, from left to right, the MSE of <H> for a measured, psd, psd-fixed-trace, inter-n-rep, and sdp-n-rep techniques, respectively. The third cluster starting from the left of diagram 800 can represent, from left to right, the MSE of <H> for a measured, psd, psd-fixed-trace, inter-n-rep, and sdp-n-rep techniques, respectively. The fourth cluster starting from the left of diagram 800 can represent, from left to right, the MSE of <H> for a measured, psd, psd-fixed-trace, inter-n-rep, and sdp-n-rep techniques, respectively. The fifth cluster starting from the left of diagram 800 can represent, from left to right, the MSE of <H> for a measured, psd, psd-fixed-trace, inter-n-rep, and sdp-n-rep techniques, respectively.

FIG. 8 plot 800 shows the mean-squared-error (MSE) in the energy estimator for one-hundred samples. MSE can be decomposed into variance and bias squared in order to demonstrate how the projection techniques reduce the variance on the distribution of the estimators at the cost of inducing a bias. In one aspect, the distribution of estimators without projection (labeled as measured) show no bias as expected based on the Gaussian error model and the fact the energy can be a linear functional of the 2-RDM.

FIG. 9 plot 900 shows the trace distance of the 2-RDM-measured or purified-from the true 2-RDM. The cluster of curves 902 can represent the trace distance versus the sampling error threshold for measured, psd, psd-fixed-trace, and inter-n-rep techniques. The curve 904 can represent the trace distance versus the sampling error threshold for a sdp-n-rep technique.

In one implementation, the projection techniques based on n-representability can be used in the purification of states corrupted by an error channel. The SDP n-representability reconstruction procedure may ensure physicality of the states by preserving symmetries and formulating the projection as a constrained optimization. In another implementation, the SDP n-representability method can be used in conjunction with the variational channel state error models to demonstrate the restoration of physicality. In one implementation, the variational channel state model can be implemented by corrupting a pure state |ψ⟩ with a channel described in Kraus operator form. In one implementation, uniform uncorrelated single-qubit error channels associated with dephasing, amplitude damping and dephasing, and depolarizing noise can be used. The dephasing and amplitude damping channels can be parameterized with the assumption that 5% of the coherence time has elapsed with respect to $T_1$ and $T_2$. For the depolarizing channel, the Kraus operators can be constructed assuming 5% of the dephasing time $T_2$ has elapsed. For the points along the binding curve of diatomic hydrogen the action of the channel on the pure-state can be calculated as $$\rho_{channel} = \sum_{i=1}^{M} K_i \rho_{pure} K_i^{\dagger}. \tag{43}$$

In one implementation, the ensemble 2-RDMs can be reconstructed with 2-positive n-representability conditions using the SDP projection technique, where the error matrices are set as the spin-adapted components of the 2-RDM associated with $\rho_{channel}$. In another aspect, spin adapting can eliminate the need to explicitly enforce the antisymmetry of the 2-RDM elements and can thus reduce the total number of constraints in the SDP.

Figure 10:
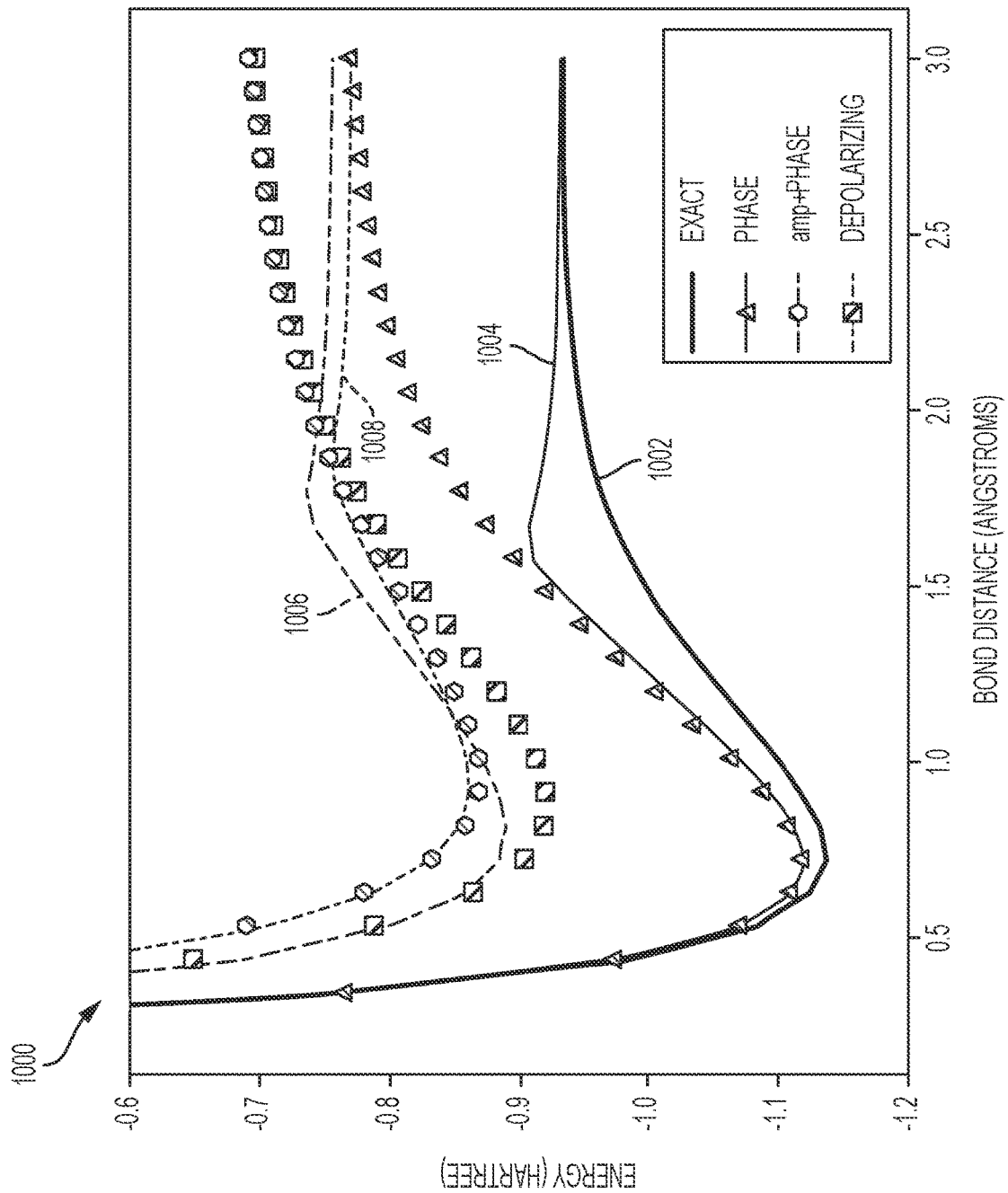
FIG. 10 shows a diagram of energy curves for molecular hydrogen after action of three error channels.

In one aspect, the energy of the $H_2$ system under the action of the separate channels can be plotted in FIG. 10 along with the energy computed as a functional of the reconstructed 2-RDM. The kinks in the dephasing and amplitude plus dephasing curves are associated with a spin-symmetry breaking, where the channels produced a mixed state dominated by a triplet state. The discontinuity in the depolarizing channel curve is associated with the channel state switching to be a mixed state with a large component of singlet character. In one aspect, the markers without a line in FIG. 10 can represent the reconstructed 2-RDM with ⟨$S_z$⟩=0 and ⟨$S^2$⟩=0 imposed by linear constraints on the 2-RDM associated with S-representability. In another implementation, the binding curves can be smooth as a function of bond distance. Though physicality can be recovered by projecting onto the closest marginal with fixed symmetries, the energy can occasionally increase. In one implementation, the restoration of physical symmetries can increase the energy. However, the qualitative improvement in the nuclear potential energy surface and the implications for forces derived from such a surface can be informative in spite of the slight energy increase that is incurred.

FIG. 10 shows a diagram 1000 of the energy curves for molecular hydrogen after action of three error channels. The uniform uncorrelated single qubit error channels applied in the variational channel state model assume the entire circuit is executed within 5% of the total coherence time. The solid lines can represent the curves without n-representability reconstruction while the markers of the same color indicate the reconstruction under exact n-representability conditions. The black curve, depicted by exact is the true ground state energy curve. The label amp refers to the single-qubit amplitude damping channel associated with $T_1$ time, phase refers to the single-qubit dephasing channel associated with $T_2$ time, and depolarizing is the associated with the single-qubit depolarizing channel.

Curve 1002 can represent an exact curve of the energy versus bond distance. Curve 1004 can represent an phase curve of the energy versus bond distance, and can correspond to the phase curve having triangular symbols. Curve 1006 can represent amplitude and phase curve of the energy versus bond distance, and can correspond to the phase curve having circular symbols. Curve 1008 can represent a depolarizing curve of the energy versus bond distance, and can correspond to the phase curve having square symbols.

Reducing the number of experiments required in the partial tomography step of VQE and other hybrid algorithms can be used for hybrid classical/quantum algorithms. In various aspects, the disclosure describes using representability conditions on fermionic marginals for reducing the number of measurements needed in a VQE operator averaging step. In one implementation, directly measuring the marginals provides the information required to integrate the results from hybrid quantum algorithms with classical quantum simulation methods.

In one implementation, fermionic representability conditions can be used to design projection techniques based on necessary conditions on 2-marginals, to reduce the total number of measurements and reduce stochastic noise seen from sampling the quantum resources.

In another implementation, the SDP projection techniques can be constructed to return physical states. In one aspect, the restoration of physicality can be observed when a pure-state is corrupted by single-qubit error channels.

In some implementation, a semidefinite program for reconstructing a noisy 2-RDM can have block-diagonal structure for chemical systems. In another aspect, the block structure of the 2-RDM can reflect the symmetries of the Hamiltonian. Therefore, the 2-RDM can be blocked according to ⟨$\hat{S}_z$⟩, ⟨$S^2$⟩, ⟨n⟩, and any spatial symmetry groups. For example, time-reversal symmetry implies a spin-adapted 1-RDM when a position space basis is used and provides additional constraints when momentum is a given quantum number. In some implementations, for Gaussian basis sets used in quantum chemistry the time-reversal invariant spin-free quantum chemical Hamiltonian may imply the following block structure: the total 1-RDM and 1-hole RDM can be blocked into α and β spin blocks.

In various aspects aspcts, a number of observables can be linear functionals of the 2-RDM and 1-RDM. These relationships can be described below.

In another aspect, the energy can of a chemical Hamiltonian can be expressed as a linear function of the 1-RDM and 2-RDM. For example, a general chemical Hamiltonian in second quantization can be represented as $$H = \sum_{ij} h_{ij} a_i^{\dagger} a_j + \frac{1}{2} \sum_{pqrs} V_{pqrs} a_p^{\dagger} a_q^{\dagger} a_s a_r, \tag{44}$$

where $h_{ij}$ and $V_{pqrs}$ are the one- and two-electron integral tensors can be written. When evaluating the expected value of the Hamiltonian ⟨H⟩ the dependence on the 1- and 2-RDM can be written as $$\langle H \rangle = \tag{45}$$
$$\sum_{ij} h_{ij} \langle a_i^{\dagger} a_j \rangle + \frac{1}{2} \sum_{pqrs} V_{pqrs} \langle a_p^{\dagger} a_q^{\dagger} a_s a_r \rangle = \sum_{ij} h_{ij}^{1} D_j^{i} + \frac{1}{2} \sum_{pqrs} V_{pqrs}^{2} D_{rs}^{pq}.$$

Figure 11:
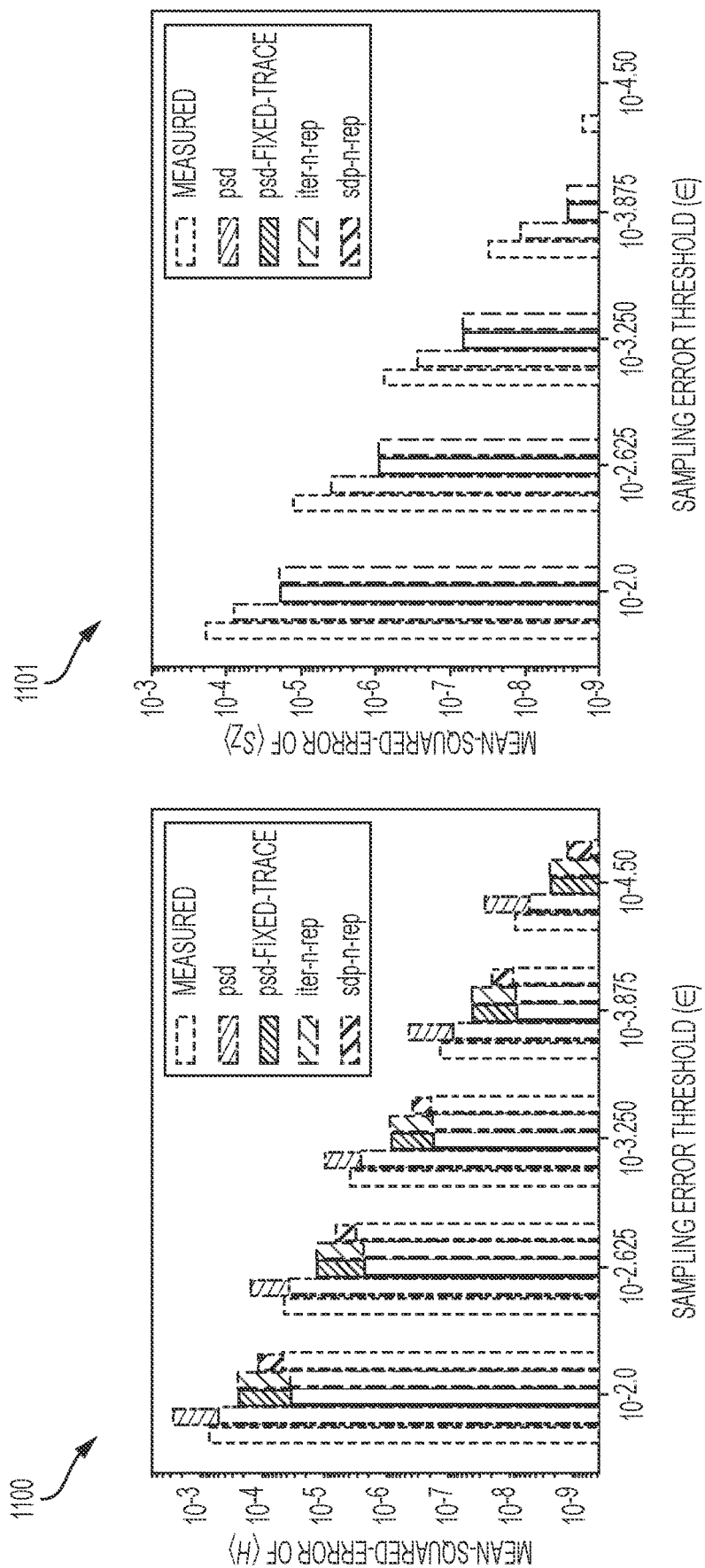
FIG. 11 shows diagrams of the MSE in the estimators for energy $\langle H \rangle$, projected spin $\langle S_z \rangle$ of diatomic hydrogen at equilibrium geometry.
Figure 12:
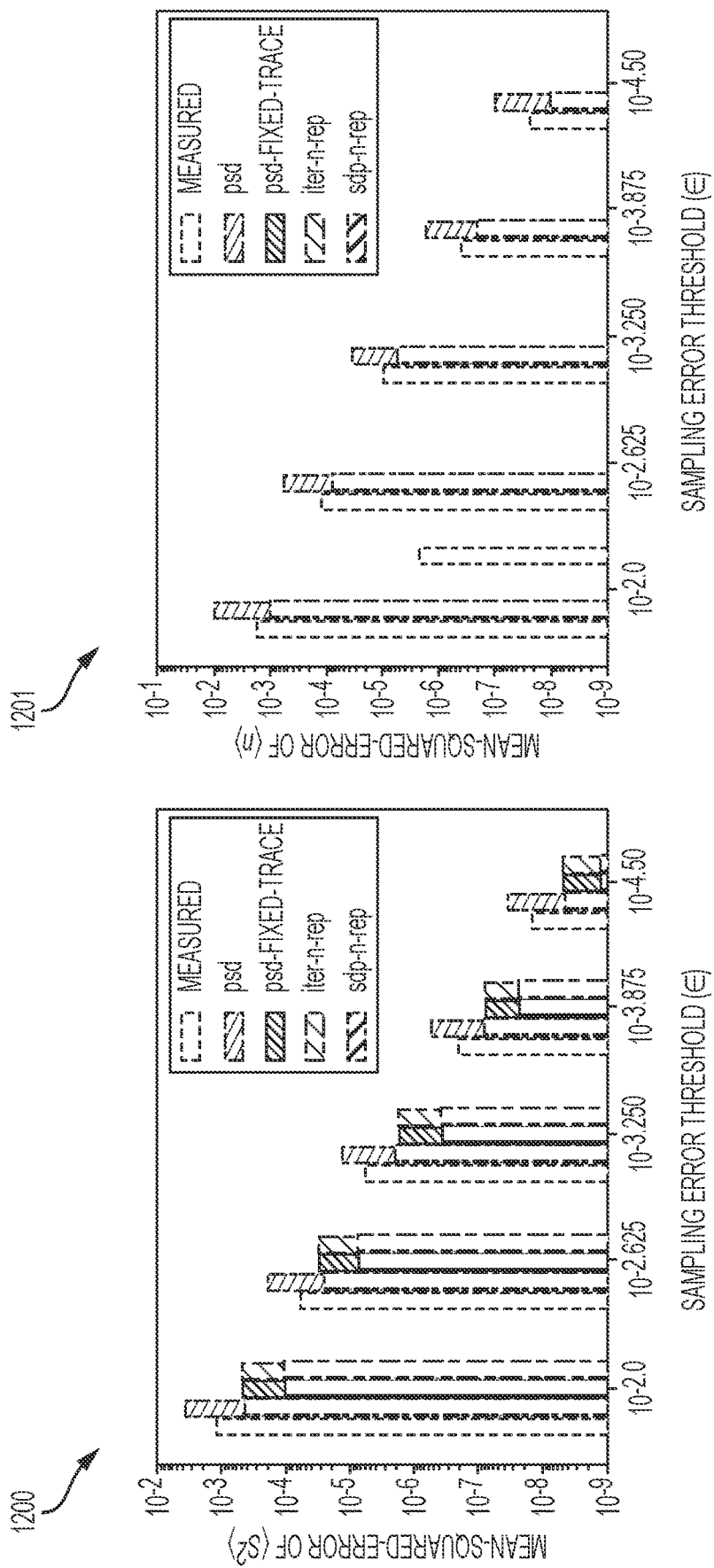
FIG. 12 shows diagrams of the MSE in the estimators for total spin $\langle S^2 \rangle$ and particle number (n) of diatomic hydrogen at equilibrium geometry.
Figure 13:
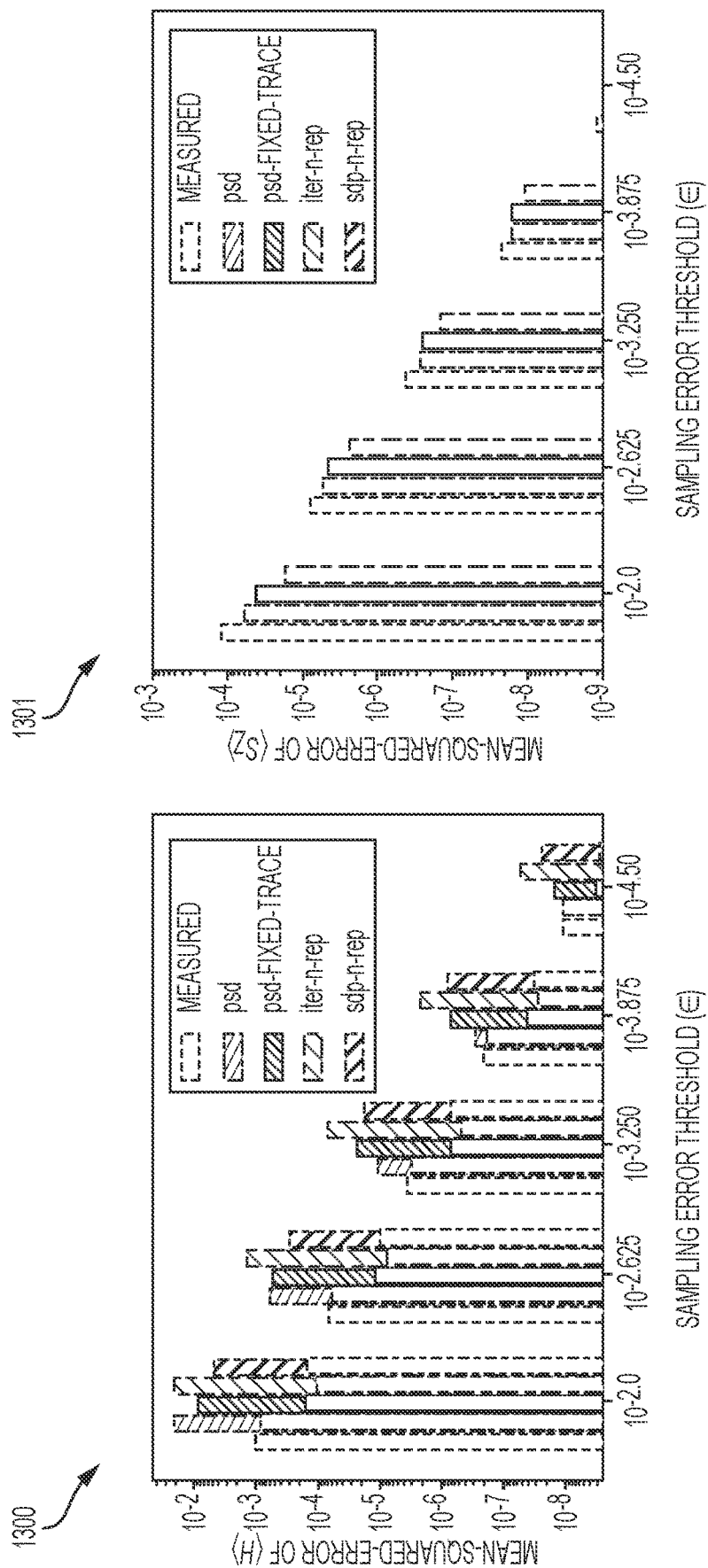
FIG. 13 shows diagrams of the MSE in the estimators for energy $\langle H \rangle$, projected spin (S t) of a linear four hydrogen system.

For the calculations depicted in at least some of FIGS. 11-13, the total angular momentum $S^2$, projected angular momentum S Z, and the particle number n operators can be used as linear constraints in the semidefinite program. Just like the energy, these operators are linear functionals of the 1- and 2-RDMs. For example, each component of the aforementioned operators can be expressed as sums of fermionic operators resulting in polynomials of rank-4 and rank-2.

$$n = \sum_{i=1}^{m} a_i^\dagger a_i \quad (46)$$

$$S_z = \frac{1}{2}\sum_{i=1}^{m/2}(a_{i,\alpha}^\dagger a_{i,\alpha} - a_{i,\beta}^\dagger a_{i,\beta}) \quad (47)$$

$$S^2 = S^- S^+ + S_z^2 + S_z \quad (48)$$

where $$S^- = \sum_{i=1}^{m/2} a_{i,\beta}^\dagger a_{i,\alpha} \quad (49)$$

$$S^+ = \sum_{i=1}^{m/2} a_{i,\alpha}^\dagger a_{i,\beta}, \quad (50)$$

where m is the total number of spin orbitals, and $\alpha$ ($\beta$) denotes the two eigenfunctions of the z-angular momentum operator for a single fermion. The expected value of each operator can be determined by summing over the indicated elements of the 2-RDM and 1-RDM.

In some aspects, the linear constraints in the SDP-projection semidefinite program can include a trace constraint on the 2-RDM, mappings between the 1-RDM, 1-hole-RDM, 2-RDM and 2-hole-RDM, and the 2-RDM to the 2-particle-hole-RDM. These mappings between the marginals can be derived by rearranging the fermionic ladder operators resulting in the following matrix element equalities:

$$^1D_q^{\ p} + ^1Q_p^{\ q} = \delta_{p,q} \quad (51)$$

$$^2D_{r,s}^{\ p,q} = ^1D_r^{\ p}\delta_s^{\ q} + ^1D_s^{\ q}\delta_r^{\ p}$$

$$-(^1D_s^{\ p}\delta_r^{\ q} + ^1D_r^{\ q}\delta_s^{\ p})$$

$$-\delta_s^{\ p}\delta_r^{\ q} + \delta_r^{\ p}\delta_s^{\ q} + ^2Q_{p,q}^{\ r,s} \quad (52)$$

$$^2G_{r,s}^{\ p,q} = \delta_s^{\ q1}D_r^{\ p} - ^2D_{q,r}^{\ p,s}. \quad (53)$$

The contraction relation between the elements of the 2-RDM and 1-RDM $$E_i^{\ 2}D_{r,i}^{\ p,i} = (n-1)^1D_r^{\ p} \quad (54)$$

can be included in the set of linear constraints.

In some aspects, the reconstruction problem described above can be formulated as a semidefinite program. In some aspects, this program can feature a sparsity of each constraint relative to the total number of variables in the program. In another aspect, a class of SDP solvers using the augmented Lagrangian technique can be used to efficiently solve SDPs of this form in quantum chemistry and condensed matter. In some aspects, the primal semidefinite program can be mathematically stated as $$\min \langle C, X\rangle \quad (55)$$

$$\text{s.t.} \langle A, X\rangle = b; X \succeq 0 \quad (56)$$

where C is in the space of symmetric matrices (C $\in \mathcal{S}_n$), X is in the space of positive semidefinite matrices (X $\in \mathcal{S}_n^+$), $\langle \cdot, \cdot \rangle$ is defined as the trace inner product Tr[C·X], b is a vector in $\mathcal{R}^m$, and A is the matrix of constraints. The conjugate dual of the primal, $$\max b^T y \quad (57)$$

$$\text{s. t } S = C - y^T A; S \succeq 0 \quad (60)$$

the matrix X is the primal variable, and the pair (y, S) are the dual variables. In some aspects, the boundary point method can be used to solve the augmented Lagrangian dual to the SDP. The total boundary point algorithm can include the following.

I. Repeat until $\delta_{outer} < \varepsilon_{outer}$
   A. Repeat until $\delta_{inner} < \varepsilon_{inner}$:
     1. Solve for $$y^k: A(A^T y) = A\left(Z^k + C + \frac{1}{\sigma}X^k\right) - \frac{1}{\sigma}b;$$

2. Positive projection step:

$$W = A^T y^k - C - \frac{1}{\sigma}X^k; Z^k = W_+; V^k = W_-$$

$$\delta_{inner} = \|\langle A, V^k\rangle - b\|$$

II. $X^{k+1} = V^k$
III. k=k+1; $\delta_{outer} = \|S^k - A^T y^k + C\|$.
IV. Update $\sigma$ Here the positive and negative projections $W_+$ and $W_-$ can be determined by the minimization $$W_+ = \text{argmin}_{U \succeq 0}\|-U\| \quad (61)$$

which corresponds to generating the $W_+$ by an eigenvalue decomposition and selecting positive eigenvalues along with their associated eigenvectors to generate the positive projection $$W_+ = \Sigma_i \lambda_i^+ |\phi_i\rangle\langle \phi_i| W_- = \Sigma_j \lambda_j^- |\phi_j\rangle\langle \phi_j| \quad (62)$$

In some implementations, the computationally expensive task can be the determination of y in the inner minimization problem. As A $A^T$ does not change its Cholesky decomposition, it can be formed prior to the calculation and then used to back-solve for $y^k$. Using the backsolve method for the inner loop requires only one step. For larger problems, the inner loop can be solved with the conjugate gradient method and thus can set the inner stopping $\varepsilon_{inner}$ condition significantly below the outer stopping condition $\varepsilon_{outer}$. For all SDPs, the L2-norm of the primal error II(A|X)−b||$_2$ as $\delta_{outer}$ can be used. All SDPs can be stopped when $\delta_{outer}$ falls below 1.0E−8 or the number of outer iterations reached five-thousand.

In some implementations, the effects of the four projection techniques the mean-squared-error can be determined as a function of noise in the Gaussian error model and type of projection procedure used. The Gaussian error model does not preclude a positive semidefinite 2-RDM and thus restoration of physical symmetries such as positive-semidefinite-ness, constrained spin- and particle-numbers may be expected to increase the observed energy of the 2-RDM with respect to the uncorrected noisy 2-RDM.

FIGS. 11 and 12 show diagrams of the mean-squared-error (MSE) in the estimators for energy $\langle H\rangle$ 1100, projected spin $\langle S_z\rangle$ 1101, total spin $\langle S^2\rangle$ 1200 and particle number (n) 1201 for $H_2$ over one-hundred samples. MSE is decomposed into variance (clear bars) and bias (solid bars).

The first cluster starting from the left of diagram 1100 can represent, from left to right, the MSE of <H> for measured, psd, psd-fixed-trace, inter-n-rep, and sdp-n-rep techniques, respectively. The second cluster starting from the left of diagram 1100 can represent, from left to right, the MSE of <H> for measured, psd, psd-fixed-trace, inter-n-rep, and sdp-n-rep techniques, respectively. The third cluster starting from the left of diagram 1100 can represent, from left to right, the MSE of <H> for measured, psd, psd-fixed-trace, inter-n-rep, and sdp-n-rep techniques, respectively. The fourth cluster starting from the left of diagram 1100 can represent, from left to right, the MSE of <H> for measured, psd, psd-fixed-trace, inter-n-rep, and sdp-n-rep techniques, respectively. The fifth cluster starting from the left of diagram 1100 can represent, from left to right, the MSE of <H> for measured, psd, psd-fixed-trace, inter-n-rep, and sdp-n-rep techniques, respectively.

The first cluster starting from the left of diagram 1101 can represent, from left to right, the MSE of <Sz> for measured, psd, psd-fixed-trace, and inter-n-rep techniques, respectively. The second cluster starting from the left of diagram 1101 can represent, from left to right, the MSE of <Sz> for measured, psd, psd-fixed-trace, and inter-n-rep techniques, respectively. The third cluster starting from the left of diagram 1101 can represent, from left to right, the MSE of <Sz> for measured, psd, psd-fixed-trace, and inter-n-rep techniques, respectively. The fourth cluster starting from the left of diagram 1101 can represent, from left to right, the MSE of <Sz> for measured, psd, psd-fixed-trace, and inter-n-rep techniques, respectively. The fifth curve of diagram 1101 can represent the MSE of <Sz> for a measured technique.

The first cluster starting from the left of diagram 1200 can represent, from left to right, the MSE of <S2> for measured, psd, psd-fixed-trace, and inter-n-rep techniques, respectively. The second cluster starting from the left of diagram 1200 can represent, from left to right, the MSE of <S2> for measured, psd, psd-fixed-trace, and inter-n-rep techniques, respectively. The third cluster starting from the left of diagram 1200 can represent, from left to right, the MSE of <S2> for measured, psd, psd-fixed-trace, and inter-n-rep techniques, respectively. The fourth cluster starting from the left of diagram 1200 can represent, from left to right, the MSE of <S2> for measured, psd, psd-fixed-trace, and inter-n-rep techniques, respectively. The fifth cluster starting from the left of diagram 1200 can represent, from left to right, the MSE of <S2> for measured, psd, psd-fixed-trace, and inter-n-rep techniques, respectively.

The first cluster starting from the left of diagram 1201 can represent, from left to right, the MSE of <n> for measured, psd, and sdp-n-rep techniques, respectively. The second cluster starting from the left of diagram 1201 can represent, from left to right, the MSE of <n> for measured and psd techniques, respectively. The third cluster starting from the left of diagram 1201 can represent, from left to right, the MSE of <n> for measured and psd techniques, respectively. The fourth cluster starting from the left of diagram 1201 can represent, from left to right, the MSE of <n> for measured and psd techniques, respectively. The fifth cluster starting from the left of diagram 1201 can represent, from left to right, the MSE of <n> for measured and psd techniques, respectively.

Figure 14:
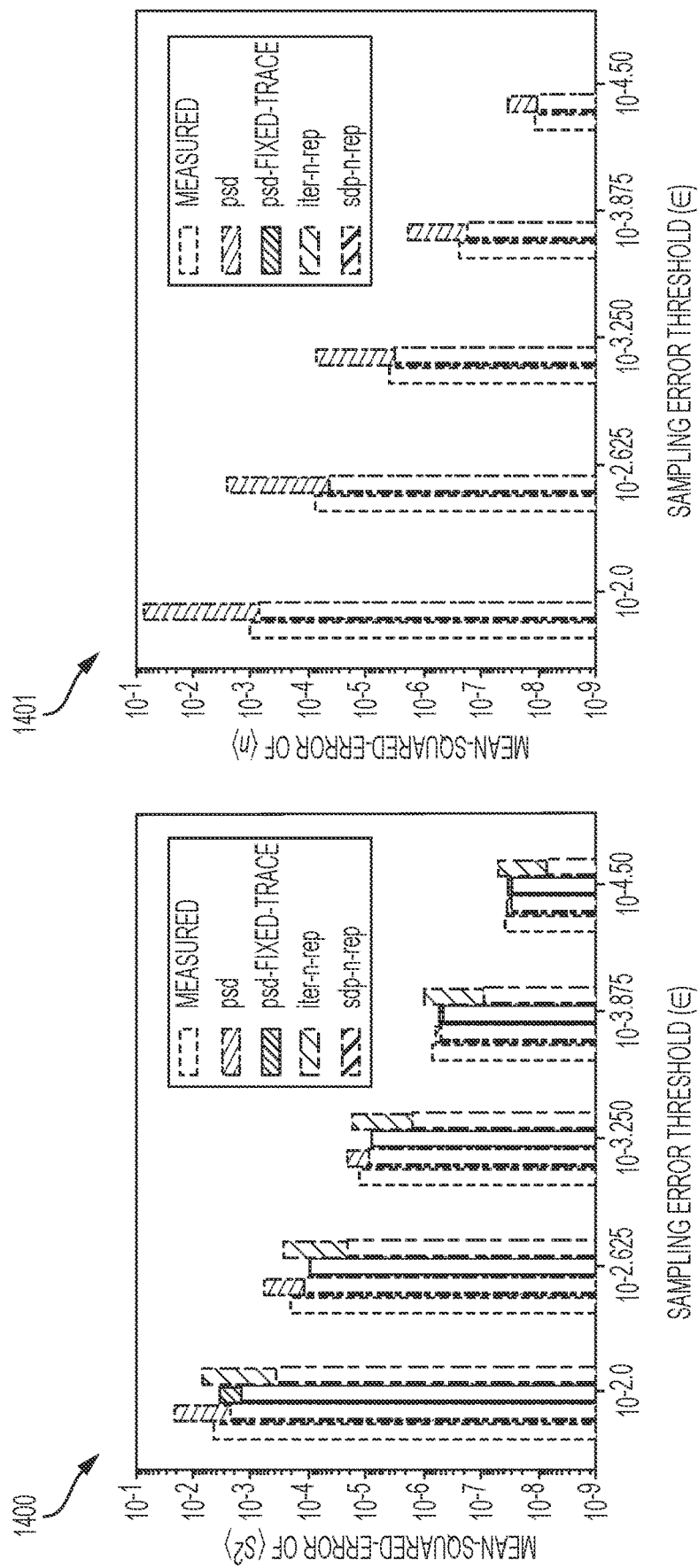
FIG. 14 shows diagrams of the MSE in the estimators for total spin $\langle S^2 \rangle$, and particle number (n) for energy over one-hundred samples of a linear four hydrogen system.

FIGS. 13 and 14 show diagrams of the mean-squared-error (MSE) in the estimators for energy $\langle H \rangle$ 1300, projected spin $\langle S_z \rangle$ 1301, total spin $\langle S^2 \rangle$ 1400 and particle number $\langle n \rangle$ 1401 for $H_4$ over one-hundred samples. MSE is decomposed into variance (clear bars) and bias (solid bars).

The first cluster starting from the left of diagram 1300 can represent, from left to right, the MSE of <H> for measured, psd, psd-fixed-trace, inter-n-rep, and sdp-n-rep techniques, respectively. The second cluster starting from the left of diagram 1300 can represent, from left to right, the MSE of <H> for measured, psd, psd-fixed-trace, inter-n-rep, and sdp-n-rep techniques, respectively. The third cluster starting from the left of diagram 1300 can represent, from left to right, the MSE of <H> for measured, psd, psd-fixed-trace, inter-n-rep, and sdp-n-rep techniques, respectively. The fourth cluster starting from the left of diagram 1300 can represent, from left to right, the MSE of <H> for measured, psd, psd-fixed-trace, inter-n-rep, and sdp-n-rep techniques, respectively. The fifth cluster starting from the left of diagram 1300 can represent, from left to right, the MSE of <H> for measured, psd, psd-fixed-trace, inter-n-rep, and sdp-n-rep techniques, respectively.

The first cluster starting from the left of diagram 1301 can represent, from left to right, the MSE of <Sz> for measured, psd, psd-fixed-trace, and inter-n-rep techniques, respectively. The second cluster starting from the left of diagram 1301 can represent, from left to right, the MSE of <Sz> for measured, psd, psd-fixed-trace, and inter-n-rep techniques, respectively. The third cluster starting from the left of diagram 1301 can represent, from left to right, the MSE of <Sz> for measured, psd, psd-fixed-trace, and inter-n-rep techniques, respectively. The fourth cluster starting from the left of diagram 1301 can represent, from left to right, the MSE of <Sz> for measured, psd, psd-fixed-trace, and inter-n-rep techniques, respectively. The fifth curve of diagram 1301 can represent the MSE of <Sz> for a measured technique.

The first cluster starting from the left of diagram 1400 can represent, from left to right, the MSE of <S2> for measured, psd, psd-fixed-trace, and inter-n-rep techniques, respectively. The second cluster starting from the left of diagram 1400 can represent, from left to right, the MSE of <S2> for measured, psd, psd-fixed-trace, and inter-n-rep techniques, respectively. The third cluster starting from the left of diagram 1400 can represent, from left to right, the MSE of <S2> for measured, psd, psd-fixed-trace, and inter-n-rep techniques, respectively. The fourth cluster starting from the left of diagram 1400 can represent, from left to right, the MSE of <S2> for measured, psd, psd-fixed-trace, and inter-n-rep techniques, respectively. The fifth cluster starting from the left of diagram 1400 can represent, from left to right, the MSE of <S2> for measured, psd, psd-fixed-trace, an inter-n-rep techniques, respectively.

The first cluster starting from the left of diagram 1401 can represent, from left to right, the MSE of <n> for measured and psd techniques, respectively. The second cluster starting from the left of diagram 1401 can represent, from left to right, the MSE of <n> for measured and psd techniques, respectively. The third cluster starting from the left of diagram 1401 can represent, from left to right, the MSE of <n> for measured and psd techniques, respectively. The fourth cluster starting from the left of diagram 1401 can represent, from left to right, the MSE of <n> for measured and psd techniques, respectively. The fifth cluster starting from the left of diagram 1401 can represent, from left to right, the MSE of <n> for measured and psd techniques, respectively.

In a first example, a computing method is described. The computing method can include obtaining a first set of values representing a measurement of a reduced density matrix (RDM). The first set of values can be based on sampling quantum states generated by one or more quantum processors. The computing method can further include constructing, by operation of one or more classical processors, a second, different set of values to represent the measurement of the RDM. The second set of values can be constructed based on the first set of values by a process that imposes one or more n-representability conditions on the second set of values to represent the measurement of the RDM.

Implementations of the first example may include one or more of the following features. The construction of the second set of values can remove errors associated with the first set of values. The one or more quantum processors can include at least one gate-based quantum processor or at least one annealing quantum processor. The computing method can be performed by a hybrid classical-quantum computing system comprising the one or more classical processors and the one or more quantum processors. The computing method can further include providing the second set of values for use in an iteration of a hybrid quantum-classical algorithm executed by the hybrid classical-quantum computing system. The one or more n-representability conditions can include one or more fermionic n-representability conditions. The RDM can include a two-particle RDM.

Implementations of the first example may further include one or more of the following features. The computing method can further include computing expectation values by performing a partial tomography of the first set of values. The process that imposes the one or more n-representability conditions can receive the expectation values as input and can produce the second set of values as output. The process that imposes the one or more n-representability conditions can execute a semidefinite program. The process that imposes the one or more n-representability conditions can perform a positive-semidefinite projection. The process that imposes the one or more n-representability conditions can perform a positive-semidefinite projection with fixed trace. The process that imposes the one or more n-representability conditions can minimize a Schatten norm. The process that imposes the one or more n-representability conditions can comprise an iterative process.

In a second example, a system is described. The system can include one or more classical processors and one or more quantum processors. The one or more classical processors can be configured to obtain a first set of values representing a measurement of a reduced density matrix (RDM). The first set of values can be based on sampling quantum states generated by the one or more quantum processors. The one or more classical processors can be further configured to construct a second, different set of values to represent the measurement of the RDM. The second set of values can be constructed based on the first set of values by a process that imposes one or more n-representability conditions on the second set of values to represent the measurement of the RDM.

Implementations of the second example may include one or more of the following features. The construction of the second set of values can remove errors associated with the first set of values. The one or more quantum processors can include at least one gate-based quantum processor or at least one annealing quantum processor. The system can include a hybrid classical-quantum computing system. The hybrid classical-quantum computing system can include the one or more classical processors and the one or more quantum processors. The one or more classical processors can further be configured to provide the second set of values for use in an iteration of a hybrid quantum-classical algorithm executed by the hybrid classical-quantum computing system. The one or more n-representability conditions can include one or more fermionic n-representability conditions. The RDM can include a two-particle RDM.

Implementations of the second example may further include one or more of the following features. The one or more classical processors can be further configured to compute expectation values by performing a partial tomography of the first set of values. The process that imposes the one or more n-representability conditions can receive the expectation values as input and can produce the second set of values as output. The process that imposes the one or more n-representability conditions can execute a semidefinite program. The process that imposes the one or more n-representability conditions can perform a positive-semidefinite projection. The process that imposes the one or more n-representability conditions can perform a positive-semidefinite projection with fixed trace. The process that imposes the one or more n-representability conditions can minimize a Schatten norm. The process that imposes the one or more n-representability conditions can include an iterative process.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

What is claimed is:

1. A computing method comprising:
 obtaining a first set of values representing a measurement of a reduced density matrix (RDM), wherein the first set of values is based on sampling quantum states generated by one or more quantum processors;
 computing expectation values by performing a partial tomography of the first set of values; and
 by operation of one or more classical processors, constructing a second, different set of values to represent the measurement of the RDM, wherein the second set of values is constructed based on the first set of values by a process that imposes one or more n-representability conditions on the second set of values to represent the measurement of the RDM,
 wherein the process that imposes the one or more n-representability conditions receives the expectation values as input and produces the second set of values as output.

2. The computing method of claim 1, wherein constructing the second set of values removes errors associated with the first set of values.

3. The computing method of claim 1, wherein the one or more quantum processors include at least one gate-based quantum processor or at least one annealing quantum processor.

4. The computing method of claim 1, wherein the computing method is performed by a hybrid classical-quantum computing system comprising the one or more classical processors and the one or more quantum processors, and the computing method further comprises providing the second set of values for use in an iteration of a hybrid quantum-classical algorithm executed by the hybrid classical-quantum computing system.

5. The computing method of claim 1, wherein the one or more n-representability conditions comprise one or more fermionic n-representability conditions.

6. The computing method of claim 1, wherein the RDM comprises a two-particle RDM.

7. The computing method of claim 1, wherein the process that imposes the one or more n-representability conditions executes a semidefinite program.

8. The computing method of claim 1, wherein the process that imposes the one or more n-representability conditions performs a positive-semidefinite projection.

9. The computing method of claim 1, wherein the process that imposes the one or more n-representability conditions performs a positive-semidefinite projection with fixed trace.

10. The computing method of claim 1, wherein the process that imposes the one or more n-representability conditions comprises an iterative process.

11. The computing method of claim 1, wherein the one or more quantum processors comprise at least two quantum processors.

12. A system comprising:
one or more classical processors; and
one or more quantum processors;
wherein the one or more classical processors are configured to:
obtain a first set of values representing a measurement of a reduced density matrix (RDM), wherein the first set of values is based on sampling quantum states generated by the one or more quantum processors;
compute expectation values by performing a partial tomography of the first set of values; and
construct a second, different set of values to represent the measurement of the RDM, wherein the second set of values is constructed based on the first set of values by a process that imposes one or more n-representability conditions on the second set of values to represent the measurement of the RDM,
wherein the process that imposes the one or more n-representability conditions receives the expectation values as input and produces the second set of values as output.

13. The system of claim 12, wherein constructing the second set of values removes errors associated with the first set of values.

14. The system of claim 12, wherein the one or more quantum processors include at least one gate-based quantum processor or at least one annealing quantum processor.

15. The system of claim 12, wherein the system comprises a hybrid classical-quantum computing system comprising the one or more classical processors and the one or more quantum processors, and the one or more classical processors are further configured to provide the second set of values for use in an iteration of a hybrid quantum-classical algorithm executed by the hybrid classical-quantum computing system.

16. The system of claim 12, wherein the one or more n-representability conditions comprise one or more fermionic n-representability conditions.

17. The system of claim 12, wherein the RDM comprises a two-particle RDM.

18. The system of claim 12, wherein the process that imposes the one or more n-representability conditions executes a semidefinite program.

19. The system of claim 12, wherein the process that imposes the one or more n-representability conditions performs a positive-semidefinite projection.

20. The system of claim 12, wherein the process that imposes the one or more n-representability conditions performs a positive-semidefinite projection with fixed trace.

21. The system of claim 12, wherein the process that imposes the one or more n-representability conditions comprises an iterative process.

22. The system of claim 12, wherein the one or more quantum processors comprise at least two quantum processors.

* * * * *

UNITED STATES PATENT AND TRADEMARK OFFICE
CERTIFICATE OF CORRECTION

PATENT NO. : 12,056,577 B1
APPLICATION NO. : 18/180513
DATED : August 6, 2024
INVENTOR(S) : Nicholas C. Rubin It is certified that error appears in the above-identified patent and that said Letters Patent is hereby corrected as shown below:

On the Title Page

Page 2, Column 2, Other Publications, Line 33 Delete "Reductio" and insert -- Reduction -- therefor In the Drawings Sheet 5 of 14, FIG. 5, Reference Numeral 508, Line 2 Delete "AND OR" and insert -- AND/OR -- therefor Sheet 5 of 14, FIG. 5, Reference Numeral 508, Line 3 Delete "AND OR" and insert -- AND/OR -- therefor In the Specification Column 1, Brief Description of the Drawings, Line 66 Delete "(S t)" and insert -- $(S_z)$ -- therefor Column 2, Brief Description of the Drawings, Line 2 Delete "(n)" and insert -- $\langle n \rangle$ -- therefor Column 10, Detailed Descriptions, Line 50 Delete "procudure" and insert -- procedure -- therefor Column 10, Detailed Descriptions, Line 66 Delete "E" and insert -- $\varepsilon$ -- therefor Column 11, Detailed Descriptions, Line 1 Delete "descvribes" and insert -- describes -- therefor Column 12, Detailed Descriptions, Line 49 Delete "(10b)" and insert -- (10) -- therefor Signed and Sealed this
Nineteenth Day of November, 2024

Katherine Kelly Vidal
*Director of the United States Patent and Trademark Office*

CERTIFICATE OF CORRECTION (continued)
U.S. Pat. No. 12,056,577 B1

Column 12, Detailed Descriptions, Lines 52-53 Eq. (11) Delete " $^1D_j{}^i = (^1D_j{}^{i*}$ " and insert -- $^1D_i^j = \left(^1D_j^i\right)^*$ -- therefor Column 13, Detailed Descriptions, Line 30 Delete "{a^b=a⊗b–b⊗a}" insert -- $\{a \wedge b = a \otimes b - b \otimes a\}$ -- therefor Column 14, Detailed Descriptions, Line 34 Delete "}," and insert -- }. -- therefor Column 14, Detailed Descriptions, Line 50 Eq. (30) Delete "$^2D = \langle \psi | a_j^\dagger a_j a_k | \psi \rangle \geqslant 0$" and insert -- $^2D = \langle \psi | a_i^\dagger a_j^\dagger a_l a_k | \psi \rangle \geqslant 0$ -- therefor Column 14, Detailed Descriptions, Line 54 Eq. (32) After "0" insert -- . --

Column 14, Detailed Descriptions, Line 56 After "$^2G$}" insert -- , --

Column 16, Detailed Descriptions, Line 11 After "$^2D_{measured}$" insert -- . --

Column 16, Detailed Descriptions, Line 20 Delete " $\sqrt{\text{Tr}[^\dagger A]}$; " and insert -- $\sqrt{\text{Tr}[A^\dagger A]}$ -- therefor Column 19, Detailed Descriptions, Line 67 Delete "an" and insert -- and -- therefor Column 20, Detailed Descriptions, Line 42 Delete "aspects aspcts," and insert -- aspects, -- therefor Column 20, Detailed Descriptions, Line 67 Delete "S Z," and insert -- $S_{Z,}$ -- therefor Column 21, Detailed Descriptions, Lines 49-50 Eq. (54) Delete " $E_i{}^2D_{r,i}^{p,i} = (n-1)^1D_r^p$ " and insert -- $\sum_i {}^2D_{r,i}^{p,i} = (n-1)\, {}^1D_r^p$ -- therefor Column 22, Detailed Descriptions, Lines 26-27 Before "$\delta_{inner} = \|\langle A, V^k \rangle - b\|$" insert -- 3. --

Column 22, Detailed Descriptions, Line 29 Delete "$\|S^k - A^T y^k + C$." and insert -- $\|S^k - A^T y^k + C\|$ -- therefor Column 22, Detailed Descriptions, Line 51 Delete "$S_{outer}$" and insert -- $\delta_{outer}$ -- therefor Column 22, Detailed Descriptions, Line 66 Delete "(n)" and insert -- $\langle n \rangle$ -- therefor